United States Patent
Chandler

(10) Patent No.: US 10,823,660 B2
(45) Date of Patent: Nov. 3, 2020

(54) OPTICAL FLOW CYTOMETRY SYSTEM

(71) Applicant: ChandlerTec Inc., Austin, TX (US)

(72) Inventor: Van S. Chandler, Georgetown, TX (US)

(73) Assignee: Chandlertec Inc., Austin, TX (US)

( * ) Notice: Subject to any disclaimer, the term of this patent is extended or adjusted under 35 U.S.C. 154(b) by 0 days.

(21) Appl. No.: 16/853,546

(22) Filed: Apr. 20, 2020

(65) Prior Publication Data

US 2020/0249145 A1 Aug. 6, 2020

Related U.S. Application Data

(63) Continuation of application No. 16/234,075, filed on Dec. 27, 2018, now Pat. No. 10,627,331.

(60) Provisional application No. 62/611,847, filed on Dec. 29, 2017.

(51) Int. Cl.
*G01N 15/14* (2006.01)
*G01N 15/10* (2006.01)

(52) U.S. Cl.
CPC ..... *G01N 15/1434* (2013.01); *G01N 15/1429* (2013.01); *G01N 15/1459* (2013.01); *G01N 2015/1006* (2013.01)

(58) Field of Classification Search
USPC ............................................. 250/435, 432 R
See application file for complete search history.

(56) References Cited

U.S. PATENT DOCUMENTS 6,366,354 B1 4/2002 Chandler
8,415,171 B2 4/2013 Rissin et al.
(Continued)

OTHER PUBLICATIONS

An Introduction to the Silicon Photomultiplier—Technical Note, sense light, Rev. 6.0, Feb. 2017, 16 pages.

*Primary Examiner* — Kiet T Nguyen
(74) *Attorney, Agent, or Firm* — Kowert, Hood, Munyon, Rankin & Goetzel, P.C.

(57) ABSTRACT

Techniques are disclosed relating to fluorescence-based flow cytometry. A flow cytometer may include a partially-reflective surface configured to reflect a first portion of fluorescent emissions from a sample to a first optical sensor and direct a second, greater portion of fluorescent emissions from the sample to a second optical sensor and a controller configured to determine a value representing the intensity of the fluorescent emissions based on a first measurement taken by the first optical sensor, a second measurement taken by the second optical sensor, or both. A flow cytometer may include a baseplate with a first side and a second, opposing side with a flow cell, a laser, and a reflective surface disposed above the first side and an optical sensor and isolating material disposed below the second side. The reflective surface receives fluorescent emissions and reflects at least a portion through the baseplate to the optical sensor. A flow cytometer may include a flow cell, a laser, a first optical sensor positioned to measure scattered laser light, a second optical sensor positioned to measure fluorescent emissions, and a controller configured to adjust the measurements taken by the second optical sensor based on a comparison of measurements taken by the first optical sensor with expected measurements based on a known beam profile of the laser beam.

20 Claims, 15 Drawing Sheets

(56) References Cited

U.S. PATENT DOCUMENTS

| | | | |
|---|---|---|---|
| 2014/0193892 A1* | 7/2014 | Mohan | G01N 15/1434 |
| | | | 435/287.2 |
| 2015/0090900 A1 | 4/2015 | Banks et al. | |
| 2017/0059485 A1 | 3/2017 | Yamamoto et al. | |
| 2017/0176338 A1 | 6/2017 | Wu et al. | |
| 2018/0156710 A1* | 6/2018 | Vrane | G01N 15/1434 |
| 2018/0156711 A1* | 6/2018 | Vrane | G01N 15/1434 |
| 2018/0231453 A1* | 8/2018 | Kaye | G01N 15/1459 |

* cited by examiner

OPTICAL FLOW CYTOMETRY SYSTEM

The present application is a continuation of U.S. application Ser. No. 16/234,075 filed Dec. 27, 2018 (now U.S. Pat. No. 10,627,331), which claims the benefit of U.S. Prov. Appl. No. 62/611,847 filed on Dec. 29, 2017; the disclosures of each of the above-referenced applications are incorporated by reference herein in their entireties.

BACKGROUND

Technical Field

This disclosure relates generally to systems and methods for performing measurements of one or more materials. More particularly, the disclosed systems and methods relate to flow cytometry technology used to analyze particles suspended in a stream of fluid.

Description of the Related Art

Flow cytometry is employed in various biotechnological endeavors such as cell counting, cell sorting, biomarker detection and protein engineering. Flow cytometry may be used in the clinical diagnosis of health disorders such as blood cancers. Flow cytometry also has applications in basic research, clinical practice and clinical trials. Various flow cytometry techniques use light sources to illuminate samples to be tested and optical sensors to detect resulting fluorescence emitted by the particles.

SUMMARY

In an embodiment, an apparatus comprises a flow cell configured to move a sample including a fluorescent material through the apparatus and a first light source configured to illuminate the sample in the flow cell to cause the fluorescent material to produce fluorescent emissions. The apparatus further comprises a first optical sensor including one or more first detection cells and a second optical sensor including one or more second detection cells, wherein the second detection cells are larger than the first detection cells. The apparatus also comprises a partially-reflective surface configured to reflect a first portion of fluorescent emissions from the sample to the first optical sensor and direct a second, greater portion of fluorescent emissions from the sample to the second optical sensor. The apparatus includes a controller configured to: receive a first measurement of the first portion of fluorescent emissions with the first optical sensor, receive a second measurement of the second portion of fluorescent emissions with the second optical sensor, and determine a value representing the intensity of the fluorescent emissions based on the first measurement, the second measurement, or both.

In another embodiment, a method comprises flowing a sample through a flow cell, wherein the sample includes a fluid suspension of one or more particles, wherein at least one of the one or more particles includes a fluorescent material. The method further comprises illuminating the sample with a first light source as it flows through the flow cell to cause the fluorescent material to produce fluorescent emissions, receiving fluorescent emissions from the sample, and reflecting a first portion of the fluorescent emissions to a first optical sensor. The method also comprises generating, with the first optical sensor, a first measurement of the first portion of the fluorescent emissions from the sample and directing a second, greater portion of the fluorescent emissions to a second optical sensor. The method further comprises generating, with the second optical sensor, a second measurement of the second portion of the fluorescent emissions from the sample; and determining a value of the intensity of the fluorescent emissions based on the first measurement, the second measurement, or both.

In still another embodiment, a flow cytometer comprises a flow cell configured to move a sample through an examination zone and a laser configured to direct a laser beam toward the examination zone to cause the fluorescent material to produce fluorescent emissions. The flow cytometer further comprises a first silicon photomultiplier (SiPM) comprising first detection cells; and a second SiPM comprising second detection cells, wherein the second detection cells are larger than the first detection cells, wherein the second detection cells are between 20-80 percent larger than the first detection cells. The flow cytometer also comprises a partially-reflective surface configured to reflect a first portion of fluorescent emissions from the sample to the first SiPM and direct a second, greater portion of fluorescent emissions from the sample to the second SiPM, wherein the ratio of the first portion of fluorescent emissions to the second portion of fluorescent emissions is between 1:19 and 1:100. The flow cytometer additionally comprises a controller configured to: receive a first measurement of the first portion of fluorescent emissions with the first optical sensor, and receive a second measurement of the second portion of fluorescent emissions with the second optical sensor.

In an embodiment, an apparatus comprises a baseplate including a first side, a second, opposing side, and an aperture defining an opening through the baseplate from the first side to the second side. The apparatus further comprises a flow cell configured to receive a sample, wherein the flow cell is disposed above the first side and a laser configured to direct a laser beam toward the flow cell, wherein the laser is disposed above the first side. The apparatus additionally comprises a first reflective surface disposed above the first side, the first reflective surface configured to receive light emitted from the flow cell and reflect the light through the opening; a first optical sensor disposed below the first side, wherein the first optical sensor is configured to receive light reflected by the reflective surface and through the opening; and isolating material disposed between the second side of the baseplate and at least some of the first optical sensor, wherein the isolating material receives the first optical sensor.

In another embodiment, a method comprises flowing a sample through a flow cell, wherein the sample includes one or more particles, wherein at least one of the one or more particles includes a fluorescent material and directing laser light at the flow cell at least in part along an x axis, wherein the wavelength of the laser light is selected to cause fluorescent emissions from the fluorescent material. The method further comprises receiving, at a reflective surface, fluorescent emissions emitted at least in part along a y axis from the fluorescent material and reflecting, with the reflective surface, at least a portion of the received fluorescent emissions at least in part along a z axis toward a first optical sensor. The method also comprises receiving, at the first optical sensor, the reflected portion of the fluorescent emissions and measuring the intensity of the reflected portion of the fluorescent emissions.

In still another embodiment, an apparatus comprises a flow cell configured to receive a fluorescent material, a laser configured to emit a laser beam that intersects the flow cell along a first axis and excites the fluorescent material, and a first optical sensor. The apparatus further comprises a first reflective surface configured to: receive fluorescent emissions from laser-excited fluorescent material, wherein the fluorescent emissions travel from the laser-excited fluorescent material to the reflective surface at least in part along a second axis that is orthogonal to the first axis, and reflect at least a first portion of the fluorescent emissions toward the first optical sensor, wherein the reflected fluorescent emissions travel from the first reflective surface to the first optical sensor at least in part along a third axis that is orthogonal to the first axis and the second axis; wherein the first optical sensor is configured to measure the intensity of the fluorescent emissions.

In an embodiment, an apparatus comprises a flow cell configured to flow a sample through the apparatus, wherein the sample includes one or more particles, wherein at least one of the one or more particles includes a fluorescent material. The apparatus further comprises a laser configured to illuminate the sample with a laser beam, a first optical sensor positioned to measure a first portion of the laser beam scattered by the sample, and a second optical sensor positioned to measure fluorescent emissions from the sample produced as a result of the sample absorbing a second portion of the laser beam. The apparatus also comprises a controller configured to adjust measurements taken by the second optical sensor based on a comparison of measurements taken by the first optical sensor with expected measurements based on a known beam profile of the laser beam.

In another embodiment, an apparatus comprises a flow cell configured to flow a sample through the apparatus, wherein the sample includes one or more particles, wherein at least one of the one or more particles includes a fluorescent material and a laser configured to illuminate the sample with a laser beam. The apparatus further comprises a first optical sensor configured to measure signals from the laser that are scattered at an X degree angle relative to the line defined by the laser beam as it illuminates the sample, wherein X is between 1 and 15 degrees; and a second optical sensor configured to measure fluorescent emissions from the sample at a Y degree angle relative to the line defined by the laser beam as it illuminates the sample, wherein Y is between 80 and 100 degrees. The apparatus also comprises a controller configured to adjust measurements taken by the second optical sensor based on a comparison of measurements taken by the first optical sensor with expected measurements based on a known beam profile of the laser beam.

In yet another embodiment, a method comprises flowing a sample through an examination zone, wherein the sample includes a fluid suspension of one or more particles, wherein at least one of the one or more particles includes a fluorescent material; and illuminating the sample with a laser beam as it flows through the examination zone to cause the fluorescent material to produce fluorescent emissions. The method further comprises receiving at an X degree angle relative to the line defined by the laser beam as it illuminates the sample, with a first optical sensor, laser light scattered by the sample wherein X is between 1 and 15 degrees; and measuring, with the first optical sensor, the received scattered laser light. The method also comprises receiving at a Y degree angle relative to the line defined by the laser beam as it illuminates the sample, with a second optical sensor, fluorescent emissions from the sample wherein Y is between 80 and 100 degrees; and measuring, with the second optical sensor, the received fluorescent emissions. The method further comprises adjusting the measurements from the received fluorescent emissions from the second optical sensor based on a comparison of measurements taken by the first optical sensor with expected measurements based on a known beam profile of the laser beam.

Figure 1:
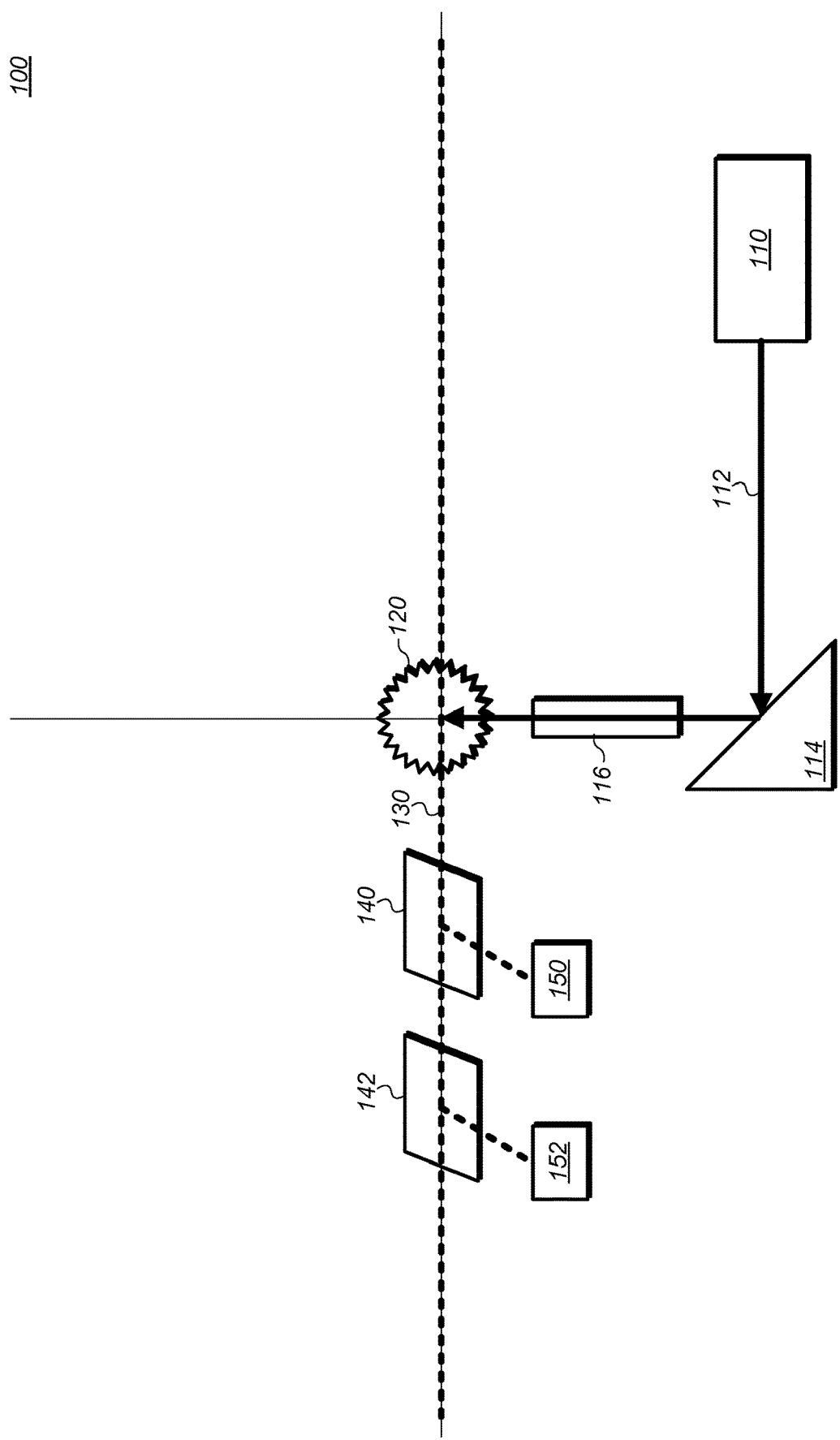
FIG. 1 is a block diagram illustrating an embodiment of a flow cytometer including a light source, a partially reflective surface, and at least two optical sensors positioned to measure fluorescent emissions from a sample.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "controller configured to determine a value representing the intensity of fluorescent emissions" is intended to cover, for example, a computer system has circuitry that performs this function during operation, even if the computer system in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, references to "first" and "second" optical sensors would not imply a temporal ordering between the two unless otherwise stated.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

Figure 2:
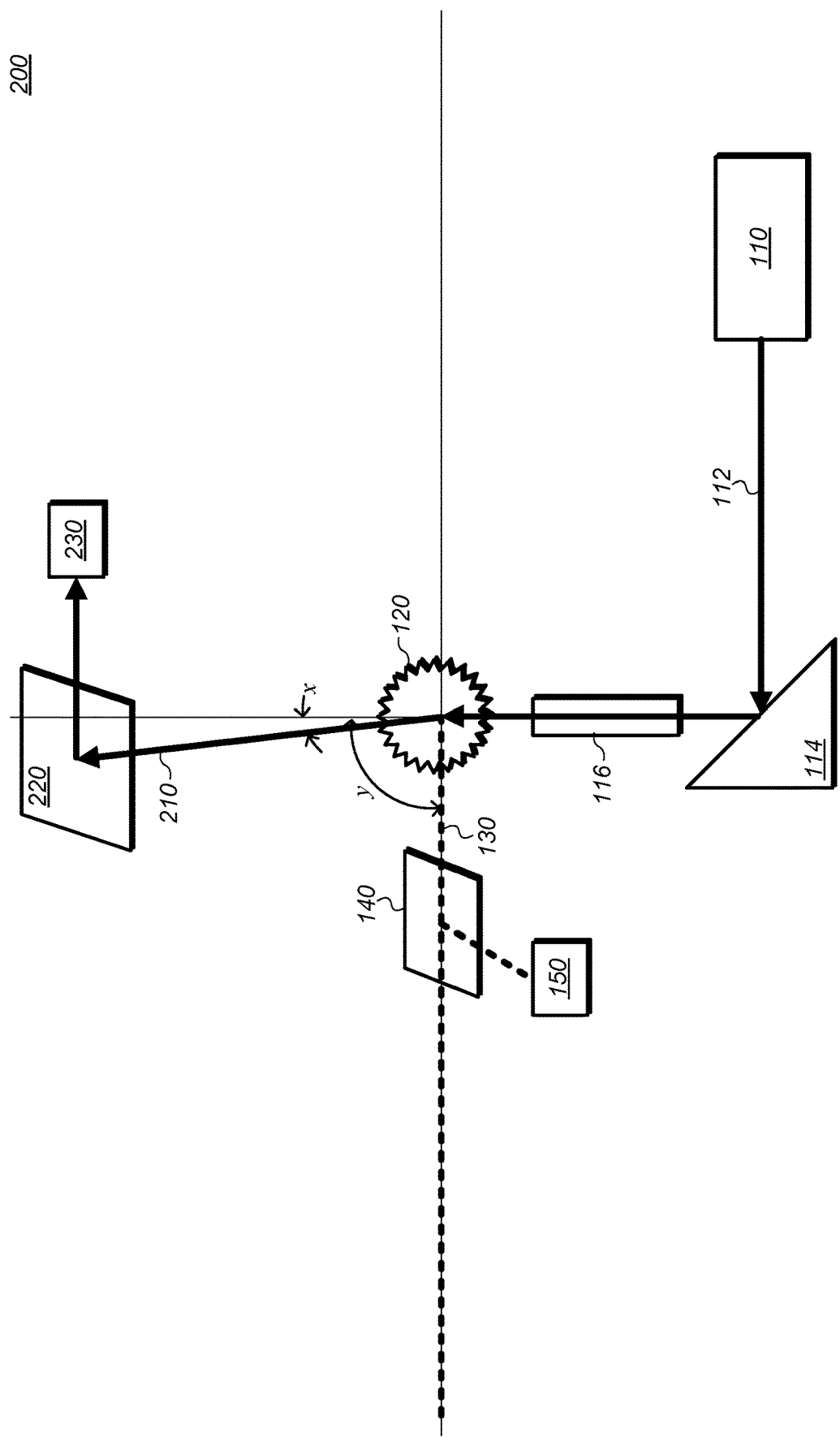
FIG. 2 is a block diagram illustrating an embodiment of a flow cytometer including a light source, an optical sensor positioned to measure fluorescence emissions, and an optical sensor positioned to measure light from the light source that has been scattered by a sample.
Figure 3:
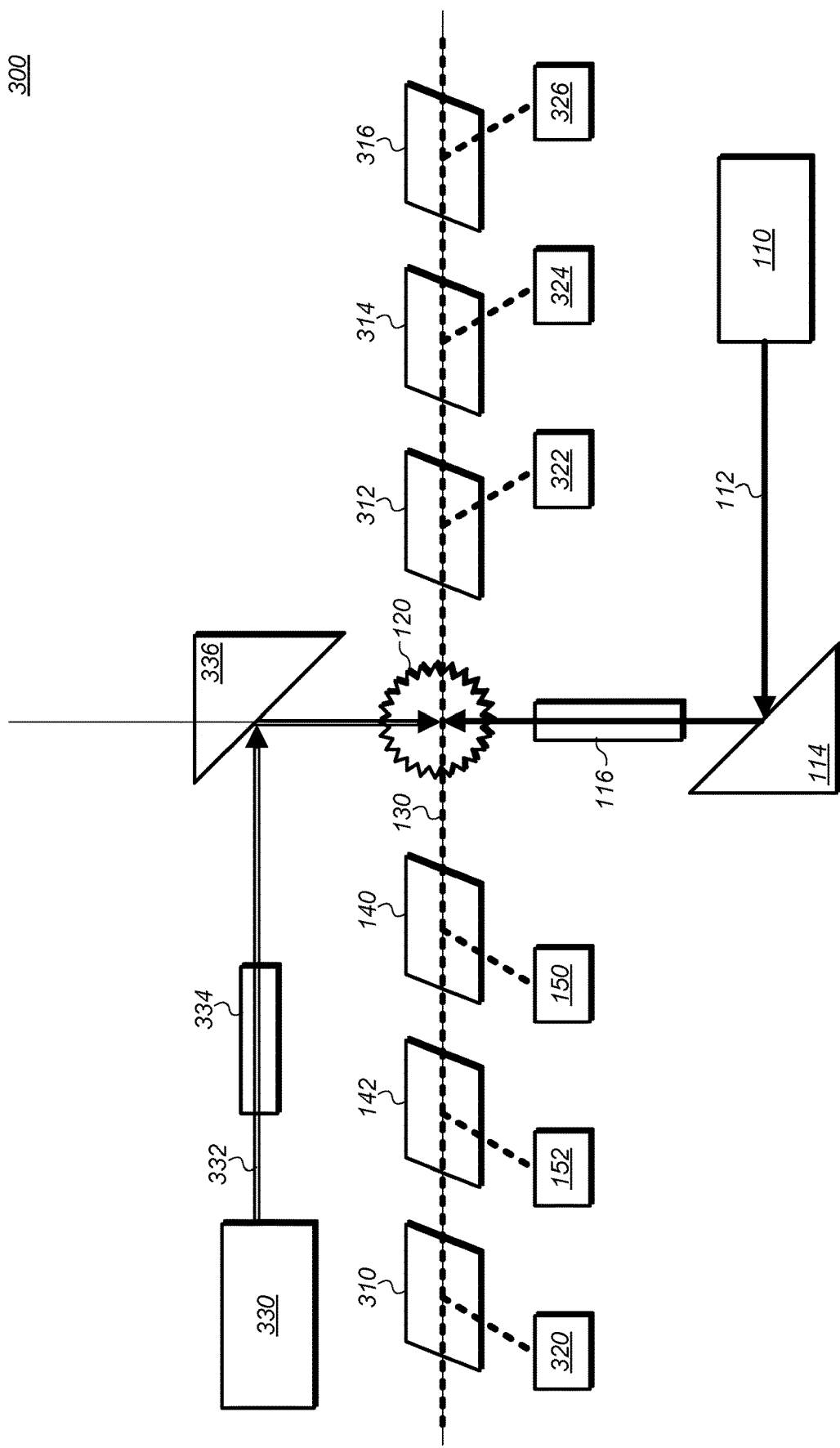
FIG. 3 is a block diagram illustrating an embodiment of a flow cytometer including two light sources and six optical sensors positioned to measure fluorescent emissions from a sample.
Figure 4:
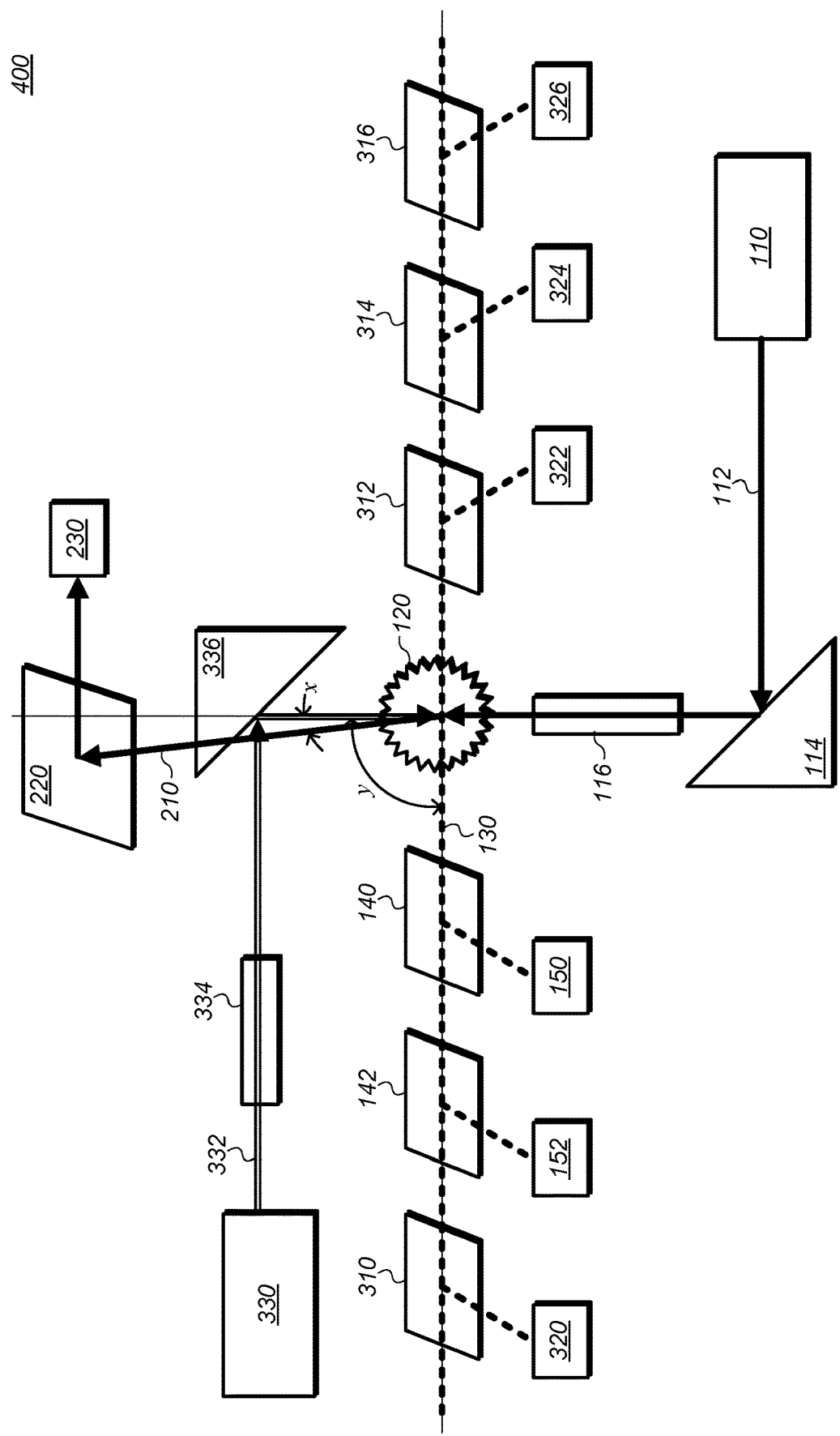
FIG. 4 is a block diagram illustrating an embodiment of a flow cytometer including two light sources, six optical sensors positioned to measure fluorescent emissions from a sample, and an optical sensor positioned to measure light from the light source that has been scattered by a sample.

This disclosure describes techniques for flow cytometry using various light sources and optical sensors. Embodiments of various flow cytometers in various configurations are described in reference to FIGS. 1-4. FIG. 1 relates to various embodiments in which a flow cytometer includes reflective surfaces that bifurcate fluorescent emissions. FIG. 2 relates to various embodiments in which a flow cytometer is configured to make beam profile-based adjustments to measurements of fluorescent emissions. FIG. 3 relates to various embodiments in which a flow cytometer includes reflective surfaces that bifurcate fluorescent emissions and two light sources. FIG. 4 relates to various embodiments in which a flow cytometer includes reflective surfaces that bifurcate fluorescent emissions and two light sources and is configured to make beam profile-based adjustments to measurements of fluorescent emissions. Embodiments of some of the various components of FIG. 4 are shown in three-dimensions and described in further detail in reference to FIG. 5-11. An exemplary bifurcated path flow cytometry method is described with reference to FIG. 12. An exemplary three-dimensional light path flow cytometry method is described with reference to FIG. 13. An exemplary beam profile-based adjustment flow cytometry method is described with reference to FIG. 14. Finally, an exemplary computer system, which may implement the controller described in FIG. 1-14, is described with reference to FIG. 15.

Exemplary Flow Cytometer with Bifurcation

Referring now to FIG. 1, a block diagram illustrating a flow cytometer 100 is shown. In various embodiments, flow cytometer 100 includes a light source 110, a reflective surface 140, a first optical sensor 150, and a second optical sensor 152. Light source 110 is configured to illuminate a sample including a fluorescent material in examination zone 120 resulting in fluorescent emissions 130. In various embodiments, light source 110 illuminates the sample in examination zone 120 with a beam 112. In some of such embodiments, beam 112 is directed and focused with optics 114 and 116. In some of such embodiments, optic 114 is a mirror that changes the direction of beam 112 and optic 116 is a lens (e.g., a cylindrical lens) that focuses beam 112 before beam 112 intersects with examination zone 120. In various embodiments, beam 112 reflects off of optic 114 before passing through optic 116, but in other embodiments beam 112 first passes through optic 116 before being reflected off of optic 114. In various embodiments, flow cytometer 100 includes additional optics (not shown) configured to manipulate, focus, diffuse, shape, reflect, refract, etc. beam 112.

Fluorescent emissions 130 are emitted from the sample as it is illuminated by light source 110. For simplicity, FIG. 1 shows fluorescent emissions 130 traveling along a horizontal axis because these fluorescent emissions 130 are the ones that might be measured by optical sensors 150 and 152, but it will be understood that fluorescent emissions may radiate in any of a number of directions. In various embodiments, fluorescent emissions 130 travel from the examination zone 120 to the reflective surface 140. In such embodiments, reflective surface 140 is configured to reflect a first portion of fluorescent emissions 130 to first optical sensor 150 and direct a second, greater portion of fluorescent emissions 130 to second optical sensor 152. In various embodiments, flow cytometer 100 includes a second reflective surface 142 configured to direct at least some of the second portion of fluorescent emissions 130 to second optical sensor 152. In some embodiments, second reflective surface 142 is a mirror and reflects all (or all but a negligible portion) of the light that it receives. In other embodiments, second reflective surface 142 may also be a partially reflective surface (embodiments in which second reflective surface 142 is a partially reflective surface are discussed herein in connection to FIGS. 3 and 4). In addition to fluorescent emissions 130, side scattered light from beam 112 may also travel along the same horizontal axis. As discussed herein, one or more of the optical sensors 150, 152, 320, 322, 324, and 326 may be configured to measure side scattered light from beam 112.

First optical sensor 150 includes a plurality of detection cells. Second optical sensor 152 include a plurality of detection cells that are larger than the detection cells of first optical sensor 150. Both first optical sensor 150 and second optical sensor 152 are configured to receive fluorescent emissions 130 and measure the portions of fluorescent emissions 130 received. First optical sensor 150 and second optical sensor 152 are configured to communicate (e.g., through wired or wireless transmission) these measurements to a controller (not shown) as discussed herein.

Flow cytometer 100 includes a controller (not shown) configured to receive a measurement of the first portion of fluorescent emissions 130 from first optical sensor 150, receive a measurement of the second portion of fluorescent emissions 130 from second optical sensor 152, and determine a value representing the intensity of fluorescent emissions 130 based on the first measurement, the second measurement, or both.

By using the reflective surface 140 to split light between the first optical sensor 150 and the second optical sensor 152, the dynamic range of fluorescent emissions 130 that flow cytometer 100 is able to detect is broader than the detectable dynamic range of a single optical sensor. In some of such embodiments, the detectable dynamic range of intensity of fluorescent emissions of the flow cytometer 100 is at least six decades. As discussed herein, this is because different configurations of optical sensors (e.g., SiPMs with higher density APD arrays with smaller individual APDs, SiPMs with lower density APD arrays with larger individual APDs) may be used together, and a controller may be used to calculate the intensity of the fluorescent emissions 130 based on the measurements taken by the first optical sensor 150 and/or the measurements taken by the second optical sensor 152.

In embodiments, flow cytometer 100 can (e.g., using a controller as discussed herein) count a low intensity of fluorescent emissions 130 using the measurement taken by the second optical sensor 152 with little or no weight given to the measurement taken by the first optical sensor 150 (e.g., because the first optical sensor will not receive and measure many photons). Conversely, flow cytometer 100 can (e.g., using a controller as discussed herein) count a high intensity of fluorescent emissions 130 using the measurement taken by the first optical sensor 150 with little or no weight given to the measurement taken by the second optical sensor 152 (e.g., because the second optical sensor 152 is saturated). As used herein, a "high intensity" of florescent emission 130 includes fluorescent emission 130 sufficient to saturate optical sensor 152. And in cases where the intensity of the fluorescent emissions 130 is in between the low level and the high level, flow cytometer 100 may (e.g., using a controller as discussed herein) use the measurements taken by first optical sensor 150 and second optical sensor 152 in determining the intensity of fluorescent emissions 130 (and therefore the presence or not a particular protein, compound, chemical, etc.) by, for example calculating a weighted sum. In various embodiments, the measurement taken by the second optical sensor 152 is a digital measurement (as defined herein) of fluorescent emissions 130 and the measurement taken by the first optical sensor 150 is an analog measurement (also as defined herein) of fluorescent emissions 130. However, in various embodiments, second optical sensor 152 may take both an analog measurement and a digital measurement. In various embodiments, using the measurements taken by the first optical sensor 150 and second optical sensor 152 as discussed herein, the controller of flow cytometer 100 is able to determine a value representing the intensity of fluorescent emissions 130. In various embodiments, this value may be based in part on one or more of the analog measurements generated by the first optical sensor 150, the digital measurement generated by the second optical sensor 152, and an analog measurement of the current generated as a result of photons being absorbed by the second optical sensor 152. Additionally, in various embodiments, flow cytometer 100 is configured to invalidate measurements if the measurements taken by first optical sensor 150 and second optical sensor 152 do not corroborate each other (e.g., one indicates a very high signal while the other indicates no signal) which may, for example, be indicative of a hardware fault.

In an ideal flow cytometer, the detection of any photons by first optical sensor 150 or second optical sensor 152 would be indicative of the presence of a particular substance in a sample being tested (e.g., for the presence of a particular molecule, protein, compound, chemical, etc.), but in various embodiments, stray and reflected light may find its way into an optical sensor 150, 152. Accordingly, in embodiments, the detection threshold of a particular sample being tested (e.g., for the presence of a particular protein, compound, chemical, etc.) is a certain number (or range of numbers) of photons (e.g., between 20-200 photons) above zero. The detection threshold may vary depending on the particular sample being tested (e.g., protein 1 has a detection threshold of 40 photons, protein 2 has a detection threshold of 100 photons). Accordingly, one goal of the flow cytometer 100 is to detect the difference between the threshold number of photons, which would mean that the sample tests positive for the protein, compound, chemical, etc., and a lower number of photons, which would mean that the sample tests negative. In some embodiments, the difference between the detection threshold value (e.g., 20-200 photons) and the lower value is sufficiently large to verify the presence of a single molecule of the fluorophore attached to a microsphere that has been excited by beam 112 as the microsphere passes through examination zone 120. In various embodiments, flow cytometer 100 may be used to test a plurality of particles in a sample (e.g., the microspheres discussed herein) and estimate a concentration of the target material (e.g., the particular protein, compound, chemical, etc.) in the sample based on the total number of photons counted, the mean number of photons counted per particle of the sample, a number of times the detection threshold has been exceeded, a known concentration/response curve for the sample, etc. or a combination.

Exemplary Flow Cytometer with Beam Profile-Based Adjustment

FIG. 2 is a block diagram illustrating an embodiment of a flow cytometer 200 including light source 110, an optical sensor 150 positioned to measure fluorescence emissions 130, and an optical sensor 230 positioned to measure light from the light source 110 that has been scattered by a sample. FIG. 2 includes light source 110, beam 112, optics 114 and 116, examination zone 120, fluorescent emissions 130, reflective surface 140, and optical sensor 150 as discussed above. FIG. 2 further includes scattered light 210, reflective surface 220, and optical sensor 230.

Scattered light 210 is a portion of beam 112 (e.g., a laser beam emitted by light source 110) that has been forward scattered by a sample (not shown) in examination zone 120. As used herein, the term "forward scatter" refers to light scattered in the direction that the beam 112 propagates and in angles 15 degrees or less to the right or left of the direction that the beam 112 propagates. In various embodiments, when beam 112 illuminates an object (e.g., a microsphere in a sample), a portion of beam 112 may scatter off the object at an acute angle. As discussed herein, the sample will absorb some of beam 112 and as a result, the fluorescent material in the sample will emit fluorescent emissions 130. As discussed herein, optical sensor 150 is positioned to measure the "side scatter" fluorescent emissions 130. As used herein, "side scatter" refers to portions of fluorescent emissions 130 that are emitted at a Y degree angle from the line defined by beam 112 as it illuminates the sample in examination zone 120. In various embodiments, Y is between 80 and 100 degrees. As shown in FIGS. 3 and 4, a plurality of optical sensors 150, 152, 320, 322, 324, 326 may be used to measure side scatter fluorescent emissions 130 even though only optical sensor 150 is shown in FIG. 2.

Optical sensor 230 is positioned to measure scattered light 210. In various embodiments, optical sensor 230 is disposed at an X degree angle (indicated in FIG. 2) relative the line defined by beam 112 as it illuminates the sample in examination zone 120. In various embodiments, X is between 1 and 15 degrees. In various embodiments, reflective surface 220 is positioned to receive scattered light 210 and direct it to optical sensor 230. While FIG. 2 shows reflective surface 220 directing scattered light 210 in a direction parallel to the direction of beam 112 as it is emitted from light source 110, scattered light 210 may be directed in any of a number of angles, including through the surface of the baseplate 520 as shown in FIGS. 5-10.

In embodiments where beam 112 is a laser beam, it will be understood that the beam profile of the laser beam is Gaussian. That is, the center of the laser beam is more intense than the edge of the laser beam. As a result, the center of the laser beam delivers more energy than the edge of the beam. Thus, if the center of beam 112 illuminates a sample, the sample will absorb more energy than if the edge of beam 112 illuminates the sample. Accordingly, if a sample that includes fluorescent material is illuminated by the center of beam 112, it is to be expected that the intensity of the resulting fluorescent emissions 130 will be higher compared to the intensity of the resulting fluorescent emissions 130 from the same sample being illuminated by the edge of beam 112.

As discussed herein, the intensity of fluorescent emissions 130 depends in part on the amount of energy delivered by beam 112 to the fluorescent material in the sample. As discussed herein, in various embodiments the examination zone 120 is very small and the sample flows through the examination zone 120 quickly such that the amount of time that beam 112 illuminates a particular particle of the sample is short. In various embodiments, this amount of time is between 1 and 20 microseconds. In embodiments, flow cytometer 200 (e.g., with a controller (not shown)) is able to determine which part of beam 112 illuminated the sample, and based on the known beam profile of beam 112 flow cytometer 200 (e.g., with a controller (not shown)) can adjust measurement taken by optical sensor 150. In various embodiments, this adjustment is based on a comparison of measurements taken by the optical sensor 150 with expected measurements based on a known beam profile of the beam 112. In some embodiments, the comparison indicates a proportional relationship between a measurement of fluorescent emissions 130 taken by optical sensor 150 and a measurement of scattered light taken by the optical sensor 230.

In various embodiments, flow cytometer 200 is able to determine (e.g., with a controller) where beam 112 (e.g., in the center, at an edge) illuminated the sample by analyzing measurements taken by optical sensor 230. For example, if the center of beam 112 illuminates the sample, the amount of scattered light 210 measured by optical sensor 230 will be lower than the amount of scattered light 210 that would be measured if the edge of beam 112 illuminates the sample. This is because when the center of beam 112 illuminates the sample, the sample absorbs more of the energy of beam 112 (and thereafter emits some fluorescent emissions 130) and therefore less light is scattered. Accordingly, in various embodiments, flow cytometer 200 determines (e.g., with a controller) where in the beam profile beam 112 has illuminated a sample based on the amount of scattered light 210 as measured by optical sensor 230. In various embodiments, flow cytometer 200 includes filters (not shown) to filter out fluorescent emissions 130 such that fluorescent emissions 130 are not measured by optical sensor 230.

For example, if a portion of a sample flowing through examination zone 120 includes a microsphere with a single molecule of a sample being tested (e.g., for the presence of a particular protein, compound, chemical, etc.), the positive detection threshold for that sample may be between 20-200 photons as counted by optical sensor 150 (or other optical sensors 152, 320, 322, 324, 326 as discussed herein). However, if the measurements taken by optical sensor 230 indicates that the edge of beam 112 illuminated the sample, a measurement of 45 photons, for example, taken by optical sensor 150 may be adjusted (e.g., by multiplying be a scaling factor) upward. Similarly, if the measurements taken by optical sensor 230 indicate that the center of beam 112 illuminated the sample, a measurement taken by optical sensor 150 may be adjusted (e.g., by multiplying be a scaling factor) downward. As used herein, "adjusting measurements" taken by optical sensor 150 includes increasing or decreasing the measurements taken by optical sensor 150 (or other optical sensors 152, 320, 322, 324, 326 as discussed herein), increasing or decreasing the detection threshold, or a combination. In various embodiments, flow cytometer 200 adjusts (e.g., with a controller) measurements taken by the optical sensor 150 by decreasing a detection threshold for the sample when the measurement taken by the optical sensor 230 is above a first scatter threshold (e.g., a predetermined number of photons indicating that the edge of beam 112 illuminated the sample). Similarly, in various embodiments, flow cytometer 200 adjusts (e.g., with a controller) measurements taken by the optical sensor 150 by increasing a detection threshold for the sample when the measurement taken by the optical sensor 230 is below a second scatter threshold (e.g., a predetermined number of photons indicating that the center of beam 112 illuminated the sample). In various embodiments, these techniques may be used to adjust measurements taken by multiple optical sensors. For example, measurements taken by both optical sensor 150 and optical sensor 152 may be adjusted based on the same measurements taken by optical sensor 230.

Exemplary Flow Cytometer with Bifurcation and Two Light Sources

FIG. 3 is a block diagram illustrating an embodiment of a flow cytometer 300 including two light sources and at least six optical sensors positioned to measure fluorescent emissions from a sample. Flow cytometer 300 includes the components of flow cytometer 100 as shown in FIG. 1 with the addition of additional reflective surfaces 310, 312, 314, 316; additional optical sensors 320, 322, 324, 326; and a second light source 330.

Light source 330 is configured to illuminate a sample including a fluorescent material in examination zone 120 resulting in fluorescent emissions 130. In various embodiments, light source 330 illuminates the sample in examination zone 120 with a beam 332. In some of such embodiments, beam 332 is directed and focused with optics 334 and 336. In some of such embodiments, optic 334 is a lens (e.g., a cylindrical lens) that focuses beam 112 and optic 336 is a mirror that changes the direction of beam 332 before beam 332 intersects with examination zone 120. In various embodiments, beam 332 reflects off of optic 336 before passing through optic 334, but in other embodiments (as shown in FIG. 3) beam 332 first passes through optical 334 before being reflected off of optic 336. In various embodiments, light source 330 emits a beam 332 that has a different wavelength than beam 112 emitted by light source 110. In various embodiments, flow cytometer 300 includes additional optics (not shown) configured to manipulate, focus, diffuse, shape, reflect, refract, etc. beam 332.

As discussed herein, in some embodiments, light source 330 is a red laser and beam 332 is a red laser beam and light source 110 is a green laser and beam 112 is a green laser beam. Further, because different fluorescent materials are excited by difference frequencies of light and because, as discussed herein, the sample may include particles with multiple types of different fluorescent materials (e.g., different fluorescent dyes, different fluorophores), light source 110 may illuminate and excite a first fluorescent material and light source 330 may illuminate and excite a second, different fluorescent material. Additionally, in various embodiments, a first fluorescent material, when excited, emits fluorescent emissions 130 at a first wavelength and a second fluorescent material, when excited, emits fluorescent emissions 130 at a second wavelength. For example, in some embodiments, light source 110 illuminates a sample with green light in examination zone 120 and a first fluorescent material in the sample emits first fluorescent emissions 130 (e.g., in the yellow-orange part of the spectrum) and light source 330 illuminates the sample with red light in examination zone 120 and a second fluorescent material in the sample emits second fluorescent emissions (e.g., in the dark red-infrared part of the spectrum).

Flow cytometer 300 includes reflective surfaces 140, 142, 310, 312, 314, and 316. In various embodiments, reflective surfaces 140, 142, 312, and 314 are partially reflective surfaces and reflective surfaces 310 and 316 are not (e.g., reflective surfaces 310 and 316 are mirrors or have mirrored surfaces). In such embodiments, fluorescent emissions 130 travel to reflective surface 140 and 312 from examination zone 120. Reflective surface 140 reflects a first portion of the fluorescent emissions 130 it receives toward optical sensor 150 and passes a second portion toward reflective surface 142. In turn, reflective surface 142 reflects a first portion of the fluorescent emissions 130 it receives toward optical sensor 152 and passes a second portion toward reflective surface 310. Reflective surface 310 reflects the fluorescent emissions 130 it receives toward optical sensor 320. Similarly, reflective surface 312 reflects a first portion of the fluorescent emissions 130 it receives toward optical sensor 322 and passes a second portion toward reflective surface 314. In turn, reflective surface 314 reflects a first portion of the fluorescent emissions 130 it receives toward optical sensor 324 and passes a second portion toward reflective surface 316. Reflective surface 316 reflects the fluorescent emissions 130 it receives toward optical sensor 326. In various embodiments, flow cytometer 300 includes filters (e.g., green filters and red filters in embodiments where beam 112 is green light and beam 332 is red light) to prevent light from beam 112 and beam 332 from reaching optical sensors 150, 152, 320, 322, 324, 326.

Further, in some embodiments, other filters may be used to prevent certain frequencies of fluorescent emissions 130 from reaching every optical sensor 150, 152, 320, 322, 324, 326. For example, if beam 112 has a first wavelength (e.g., green light) and causes a first fluorescent material to emit first fluorescent emissions 130 with a second wavelength (e.g., yellow light) and beam 332 has a third wavelength (e.g., red light) and causes a second fluorescent material to emit second fluorescent emissions 130 with a fourth wavelength (e.g., infrared light), filters may be used to ensure that first fluorescent emissions 130 at the second wavelength are received by optical sensors 150, 152, and/or 320 and not optical sensors 322, 324, or 326. Similarly, filters may be used to ensure that second fluorescent emissions 130 at the fourth wavelength are received by optical sensors 322, 324, and/or 326 and not optical sensors 150, 152, or 320.

In various embodiment, optical sensors 150, 152, 320, 322, 324, and 326 may be configured to detect different wavelengths of light. As discussed herein, side scattered light may travel in the same direction as fluorescent emissions 130 (e.g., at an angle between 80-100 degrees relative the line defined by beam 112 as it illuminates the sample in examination zone 120) and one of the optical sensors 150, 152, 320, 322, 324, and 326 may be configured to detect side scattered light from beam 112. Similarly, another one of the optical sensors 150, 152, 320, 322, 324, and 326 may be configured to detect side scattered light from beam 332. In such embodiments, some of the remaining optical sensors 150, 152, 320, 322, 324, and 326 may be configured to measure fluorescent emissions 130 emitted by a first fluorescent material after being illuminated by first light source 110 and the rest of the remaining optical sensors 150, 152, 320, 322, 324, and 326 may be configured to measure fluorescent emissions 130 emitted by a second or third fluorescent materials after being illuminated by second light source 330 as discussed herein.

In various embodiments, flow cytometer 300 is able to measure these first fluorescent emissions 130 (e.g., to evaluate the presence or not of a substance in the sample under test) and to measure the second fluorescent emissions 130 to determine additional information about the sample. In such embodiments, flow cytometer 300 (e.g., with a controller) is able to receive a measurement of the second fluorescent emissions 130 from one or more optical sensors 150, 152, 320, 322, 324, 326, and based on the measurement of the second fluorescent emissions 130, determine to which set of a plurality of sets a portion (e.g., a fluorescent microsphere) of the sample belongs. In such embodiments, various particles of the sample comprise beads (e.g., microspheres as discussed herein) including a second, third, or even fourth fluorescent material. Each of these beads is a member of a set of beads. A sample may be comprised of various sets of beads, and in embodiments, the various sets of beads are tagged with a particular material (e.g. a fluorescent dye). That is, beads in set one include a first kind of fluorescent dye, beads in set two include a second kind of fluorescent dye, etc. In these embodiments, when beam 332 emitted by light source 330 illuminates a portion of the sample (e.g., a particular bead in the sample) as it passes through the examination zone 120, the second fluorescent dye becomes excited and emits second fluorescent emissions 130. In various embodiments, the wavelength of these second fluorescent emissions 130 depend on the wavelength of beam 332 and the chemical properties of the particular kind of fluorescent dye used as the second fluorescent dye. These second fluorescent emissions are received (and measured) by flow cytometer 300 (e.g., with optical sensors 150, 152, 320, 322, 324, and/or 326), the flow cytometer 300 is able to determine (e.g., with a controller), of which set of beads the particular bead is a member based on the second fluorescent emissions 130.

In various embodiments, flow cytometer 300 is able to determine (e.g., with a controller) the wavelength of the second fluorescent emissions 130 and determine which particular kind of fluorescent dye is present (and therefore of which set the particular bead is a member). For example, if set one includes a first kind of fluorescent dye that emits second fluorescent emissions 130 at a first wavelength (e.g., in the dark red part of the spectrum) when illuminated by beam 332 (e.g., red light) and if set two includes a second kind of fluorescent dye that emits second fluorescent emissions 130 at a second wavelength (e.g., in the infrared part of the spectrum) when illuminated by beam 332 (e.g., red light), if flow cytometer 300 is able to determine that the second fluorescent emissions are dark red, then flow cytometer 300 is able to determine that the bead belongs to set one (and not set two).

Additionally or alternatively, the various sets of beads may include second fluorescent materials that emit light at different intensities when illuminated by the same wavelength of beam 332. In such embodiments, flow cytometer 300 is able to differentiate between the various sets of beads based at least in part on the intensity of second fluorescent emissions. For example, if set one includes a first kind of fluorescent dye that emits second fluorescent emissions 130 at a first intensity (e.g., 200-400 photons) when illuminated by beam 332 (e.g., red light) and if set two includes a second kind of fluorescent dye that emits second fluorescent emissions 130 at a second intensity (e.g., 100-200 photons) when illuminated by beam 332 (e.g., red light), if flow cytometer 300 is able to determine that the second fluorescent emissions 130 have an intensity of about 300 photons, then flow cytometer 300 is able to determine that the bead belongs to set one (and not set two).

Additionally or alternatively, the various sets of beads may include second, third, and fourth fluorescent materials in different concentrations. When illuminated by beam 332, the second, third, and fourth fluorescent materials emit various amounts of characteristic fluorescent emissions 130 correlated to the concentration of second, third, and fourth fluorescent materials in the set of beads. In some of such embodiments, one of more of the optical sensors 150, 152, 320, 322, 324, 326 are primarily used to measure a particular wavelength of fluorescent emissions 130 characteristic of one of the second, third, and fourth fluorescent materials. For example, optical sensor 324 may be configured to detect wavelengths of fluorescent emissions 130 from the second fluorescent material and optical sensor 326 may be configured to detect wavelengths of fluorescent emissions 130 from the third fluorescent material. Based on the proportion of fluorescent emissions 130 detected by optical sensor 324 and the optical sensor 326, the concentration of second and third fluorescent material in the beads in the sample may be estimated and the particular one of the various sets of beads identified.

Exemplary Flow Cytometer with Bifurcation, Two Light Sources, and Beam-Profile Based Adjustment FIG. 4 is a block diagram illustrating an embodiment of a flow cytometer 400 including all of the features described in FIGS. 1-3 including two light sources, six optical sensors positioned to measure fluorescent emissions from a sample, and an optical sensor positioned to measure light from the light source that has been scattered by a sample. Flow cytometer 400 includes the components of flow cytometers 100, 200, and 300 as shown in FIGS. 1-3, and the flow cytometer 400 is configured to perform the various functions performed by flow cytometers 100, 200, and 300. While flow cytometer 400 includes seven reflective surfaces 140, 142, 220, 310, 312, 314, 316 and seven optical sensors 150, 152, 230, 320, 322, 324, and 326, other embodiments may include more optical sensors (e.g., with additional sets of reflective surfaces and optical sensors in line with the optical sensors 150, 152, 320, 322, 324, and 326) or fewer optical sensors (e.g., omitting reflective surfaces 310 and 316 and optical sensors 320 and 326). Further, while flow cytometer 400 includes all of the components of FIGS. 1-3, a flow cytometer could have some or all of the various features described herein in other combinations. For example, a first embodiment of a flow cytometer may include components of FIG. 1 and FIG. 2 without a light source 330, beam 332, optic 334, or optic 336. A second embodiment of a flow cytometer may include the components of FIG. 2 and a light source 330, beam 332, optic 334, and optic 336 but not the additional reflective surfaces 142, 310, 312, 314, 316 and respective optical sensors 152, 320, 322, 324, 326.

The sample used in connection with flow cytometers 100, 200, 300, 400 includes a fluid suspension of one or more particles where at least some of the particles include fluorescent material. As described in U.S. Pat. Nos. 5,747,349 and 6,266,354, each incorporated herein by reference, in various embodiments the sample used in connection with flow cytometers 100, 200, 300, 400 includes fluorescent microspheres, which are beads impregnated with a fluorescent dye. Such microspheres (also referred to herein as "beads") may include microparticles, beads, polystyrene beads, microbeads, latex particles, latex beads, fluorescent beads, fluorescent particles, colored particles and colored beads. In various embodiments, the microspheres serve as vehicles for molecular reactions. In various embodiments, microspheres or beads range in diameter from 10 nanometers to 100 microns and are uniform and highly spherical. Microspheres for use in flow cytometry may be obtained from manufacturers, such as Luminex Corp. of Austin, Tex. In some of such embodiments, surfaces of the microspheres are coated with a tag that is attracted to a receptor on a cell, an antigen, an antibody, or the like in the sample fluid. So, the microspheres, having fluorescent dyes, bind specifically to cellular constituents. In various embodiments, two or more dyes are used simultaneously, each dye being responsible for detecting a specific condition. The light sources 110, 330 excite the fluorescent dye(s), causing the fluorescent dye(s) to emit light that can be detected by optical sensors 150, 152, 230, 320, 322, 324, and 326.

In various embodiments, flow cytometer 100, 200, 300, 400 include one or more controllers. Such controllers may be implemented, for example, by the components discussed herein in connection to FIG. 15. In such embodiments, this controller(s) is configured to execute instructions that cases the flow cytometer 100, 200, 300, 400 to perform the various actions (e.g., activating and deactivating light sources 110, 330, taking measurements, flowing samples through flow cytometer 100, 200, 300, 400) discussed herein. In various embodiments, the controller is disposed below the baseplate 520 of flow cytometer 100, 200, 300, 400 discussed herein. In embodiments, controller receives output signals (e.g., measurements of light) from the one or more optical sensors 150, 152, 230, 320, 322, 324, and 326.

In various embodiments, light source 110 is a green laser and beam 112 is a green laser beam. In some of such embodiments, flow cytometer 100, 200, 300, 400 includes one or more filters (not shown) to filter out green light (e.g., scattered off of the sample) from reaching some or all of optical sensors 150, 152, 320, 322, 324, 326. In various embodiments, light source 330 is a red laser and beam 332 is a red laser beam. In some of such embodiments, flow cytometer 300, 400 includes one or more filters (not shown) to filter out red light (e.g., scattered off of the sample) from reaching some or all of optical sensors 150, 152, 320, 322, 324, 326. Additionally, in various embodiments, light source 110 and/or light source 330 emit their respective beams 112 and 332 continuously, but in other embodiments light source 110 and/or light source 330 may emit their respective beams 112 and 332 in pulses (e.g., a pulse lasting about one nanosecond).

As used herein, the term "examination zone" refers to the portion of a flow cytometer where a beam illuminates a sample flowing through the flow cytometer. In various embodiments, the examination zone is a portion of the flow cell 500 discussed herein. The examination zone is generally only a slightly larger than the particles comprising the sample. In some embodiments where the microspheres in the sample are about 5 microns in diameter, the examination zone measures about 20 microns long.

In various embodiments, the reflective surfaces 140, 142, 312, and/or 314 are partially reflective surfaces. In some of such embodiments, one or more reflective surfaces 140, 142, 312, and 314 are pieces of glass with an anti-reflective coating. In some embodiments, such partially reflective surfaces reflect a first portion of the fluorescent emissions 130 toward an optical sensor (e.g., optical sensor 150, 152, 322, 324) and pass a second, greater portion of the fluorescent emissions 130 through the partially reflective surface toward another reflective surface (e.g., reflective surfaces 142, 310, 314, 316) that in turn reflects at least some of the second portion toward another optical sensor (e.g., optical sensor 152, 320, 324, 326). In various embodiments, the ratio of the first portion of fluorescent emissions 130 to the second portion of fluorescent emissions 130 is between 1:19 and 1:100. Further, in various embodiments, one or more reflective surfaces 140, 142, 312, and 314 are configured to reflect specific ranges of wavelengths toward its respective optical sensor 150, 152, 322, 324 such that its respective optical sensor is illuminated only with light from a certain spectrum. For example, in various embodiments, reflective surface 142 is a piece of glass with an anti-reflective coating and optical sensors 152 and 320 are configured to measure fluorescent emissions 130 (e.g., light in the yellow-orange spectrum) emitted by a fluorescent material in the sample after being illuminated by beam 112 (e.g., green light).

In various embodiments, some or all of the optical sensors 150, 152, 230, 320, 322, 324, and 326 include a light receiving portion (e.g., a portion containing the APD array discussed herein) configured to receive light and generate measurements and a support portion containing components configured to transmit one or more measurements (e.g., to a controller of flow cytometer 100, 200, 300, 400), amplify signals (e.g., with emitter-coupled logic), filter signals, etc. In various embodiments, some or all of optical sensors 150, 152, 230, 320, 322, 324, and 326 may be mounted on the same circuit board.

In various embodiments, some or all of the optical sensors 150, 152, 230, 320, 322, 324, and 326 are silicon photomultipliers ("SiPM") such as the SiPMs manufactured by SensL Technologies Ltd. In various embodiments, SiPMs are solid-state single-photon-sensitive devices built from an avalanche photodiode ("APD") array on common silicon substrate. In various embodiments, the dimensions of the APDs in the APD array may vary from 10 to 100 micrometers, and their density can be up to 10000 per square millimeter. In embodiments, when the APDs receive a photon (e.g., from fluorescent emissions 130) the APD is reverse-biased and the APD outputs an avalanche current. Measuring the output avalanche current from the APD array can be used, therefore, to measure the measure the intensity of the light being received by the SiPM. A more intense light means more photons are impacting the APD, and potentially more triggered avalanche current. However, because the APDs operate using avalanche current, once an impacting photon has triggered the avalanche current in a particular APD, that APD is saturated until the current dissipates. As long as an APD is saturated, additional impacting photons do not trigger additional avalanche current. The amount of time an APD takes to clear the avalanche current and therefore no longer be saturated depends in part upon the size of the APD. That is, a smaller APD can clear the avalanche current faster than a larger APD. As used herein, the term "detection cells" refers to elements of an optical sensor that receives light and responds to it (e.g., by generating a current, generating a voltage). As used herein, the term "detection cells" includes but is not limited to APDs in an APD array. However, the term detection cells may also refer to the components in any of a number of optical sensor that receive impacting photons. Such components may work by using the photoelectric effect for detection (as APDs do), measuring induced phonon generation, detecting changes in polarization states of suitable materials, detecting induced photochemical changes in a material, detecting weak interaction effects, etc.

A SiPM with an APD array consisting of relatively smaller APDs arranged in a higher density is better able to count the number of photons in a lower intensity light signal because each photon in the lower intensity light signal is more likely to be absorbed by an APD and trigger and avalanche current. This is because a higher density APD with smaller individual APDs array is more likely to have more individual APDs that are capable of absorbing an incoming photon in part because there are more APDs in total and because smaller APDs cease being saturated more quickly compared to a lower density APD array with larger individual APDs. Put another way, a lower density APD array with larger individual APDs would become saturated more quickly than a higher density APD array with smaller individual APDs. In embodiments, individual SiPMs have a detectable dynamic range of between four and five decades. However, as discussed herein, using a lower density APD array with larger individual APDs in conjunction with a higher density APD array with smaller individual APDs can extend the detectable dynamic range of the flow cytometer 100, 300, 400 such that the flow cytometer 100, 300, 400 has a detectable dynamic range of six decades or more.

In particular, in various embodiments of flow cytometers, such as flow cytometer 100, 300, and 400, a partially reflective surface 140 reflects a first portion of fluorescent emissions 130 to first optical sensor 150 and directs a second, greater portion of fluorescent emissions to the second optical sensor 152. If the second optical sensor 152 is a SiPM with relatively larger APDs arranged in a lower density and the first optical sensor 150 is a SiPM with relatively smaller APDs arranged in higher density, second optical sensor 152 can be used to count photons from lower intensity fluorescent emissions 130 and first optical sensor 150 can be used to count photons for higher intensity fluorescent emissions 130. This is because when fluorescent emissions 130 have a lower intensity, second optical sensor 152 is more likely to be able to count the individual photons because the APD array of the second optical sensor 152 is not saturated. Because first optical sensor 152 only receives the smaller portion of the lower fluorescent emissions, first optical sensor 152 is unlikely to detect many photons. However, when fluorescent emissions 130 have a higher intensity, second optical sensor 152 is more likely to become saturated by received photons and unable to count additional photons. In this case, because first optical sensor 150 receives a smaller portion of the photons, first optical sensor 150 is more likely to be able take a more useful measurement. In some of such embodiments, the detection cells of the second optical sensor 152 comprise an array of X micron square detection cells and the detection cells of the first optical sensor 150 comprise and array of Y micron square detection cells, wherein the ratio of X:Y is between 1.2:1 to 1.8:1. In some of such embodiments, X is 35 microns and Y is 20 microns.

In various embodiments the SiPMs includes a plurality of terminals including an anode, a "fast output terminal," and a cathode (used as a return current path for the anode and fast output terminal). As used herein, the fast output terminal refers to a terminal that outputs a signal that is the derivative of the internal fast switching of the SiPM's various individual APDs in response to the detection of a single photon by the individual APDs. The signal output by the fast output terminal is the sum, for the SiPM's APD array, of the derivative of the internal fast switching of the various individual APDs. As discussed herein, a "digital measurement" taken by an optical sensor 150, 152, 230, 320, 322, 324, and 326 includes the signal output by the fast output terminal. In various embodiments, such digital measurements are a total count of the number of photons detected by the optical sensor (e.g., second optical sensor 152) during a period of time. The signal output by the anode is the total avalanche current generated by APD array. As discussed herein, an "analog measurement" taken by an optical sensor 150, 152, 230, 320, 322, 324, and 326 includes the signal output by the anode-cathode. In various embodiments, such analog measurements are the current generated as a result of photons being absorbed by the optical sensor (e.g., first optical sensor 150). In various embodiments, flow cytometer 100, 200, 300, 400 receives measurements from the fast output terminal and the anode from some or all of the optical sensors 150, 152, 230, 320, 322, 324, and 326.

Three-Dimensional Drawings of an Exemplary Flow Cytometer

Figure 5:
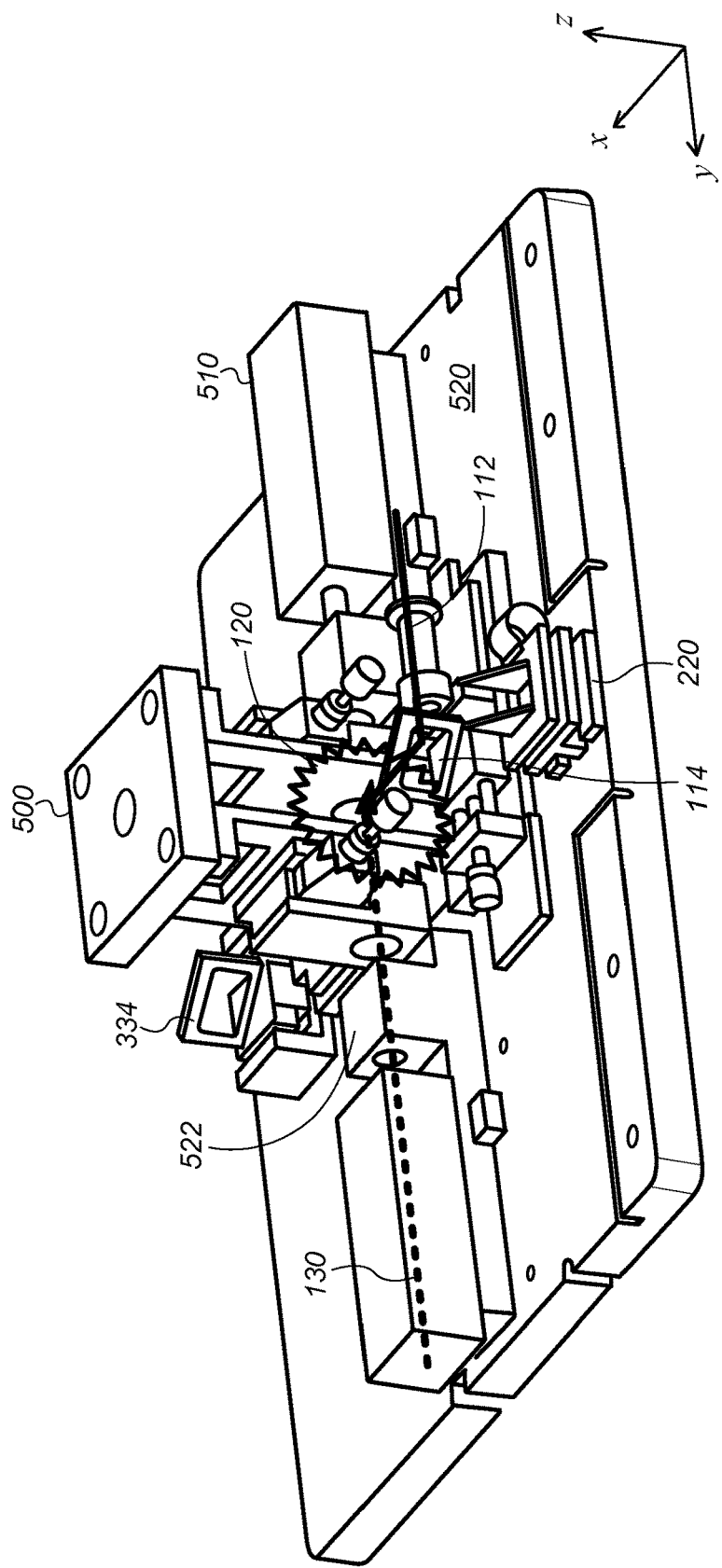
FIG. 5 is a drawing showing a top perspective view of portions of the flow cytometer of FIG. 4.
Figure 6:
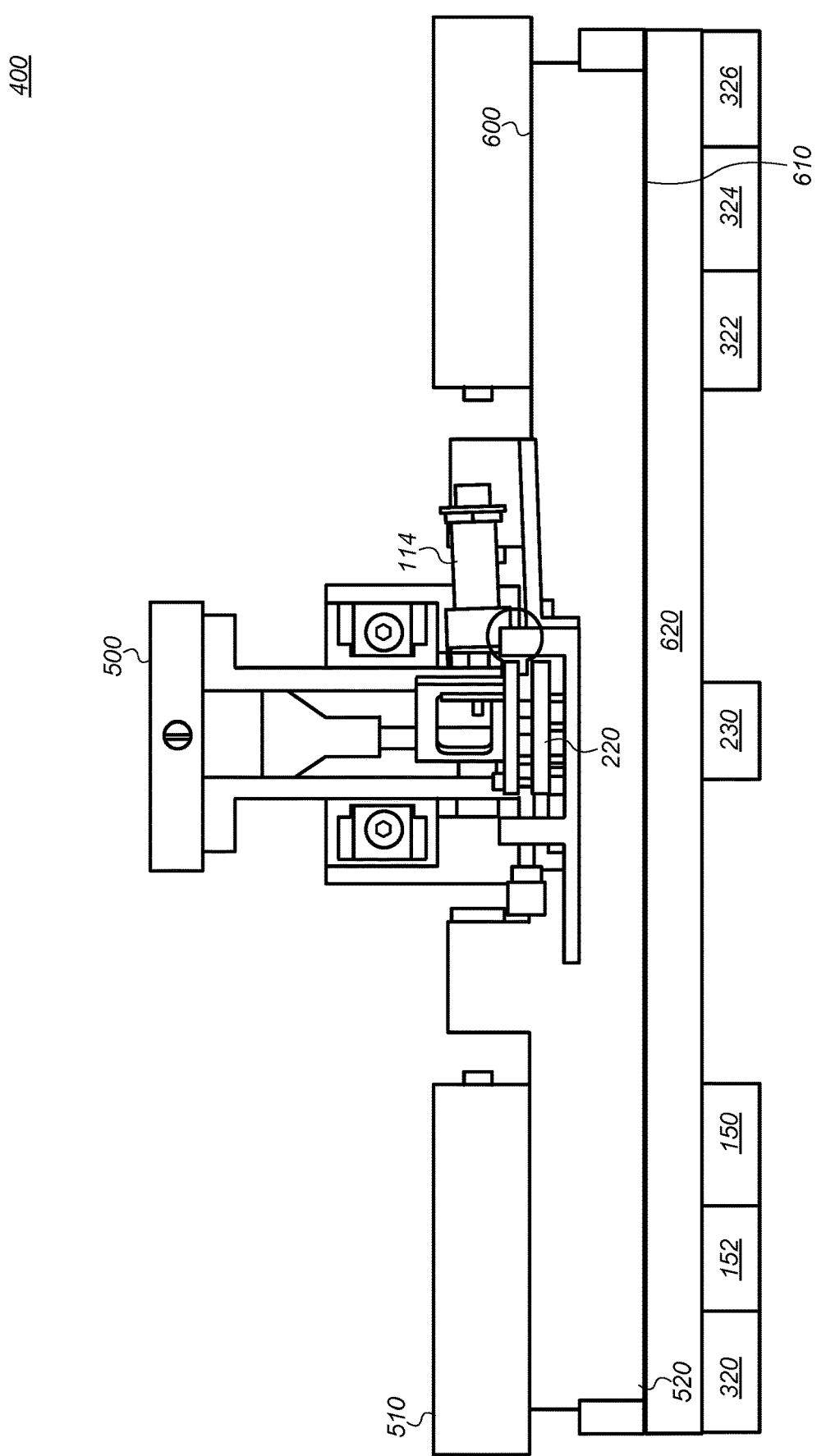
FIG. 6 is a drawing showing a profile side view of portions of the flow cytometer of FIG. 4.
Figure 7:
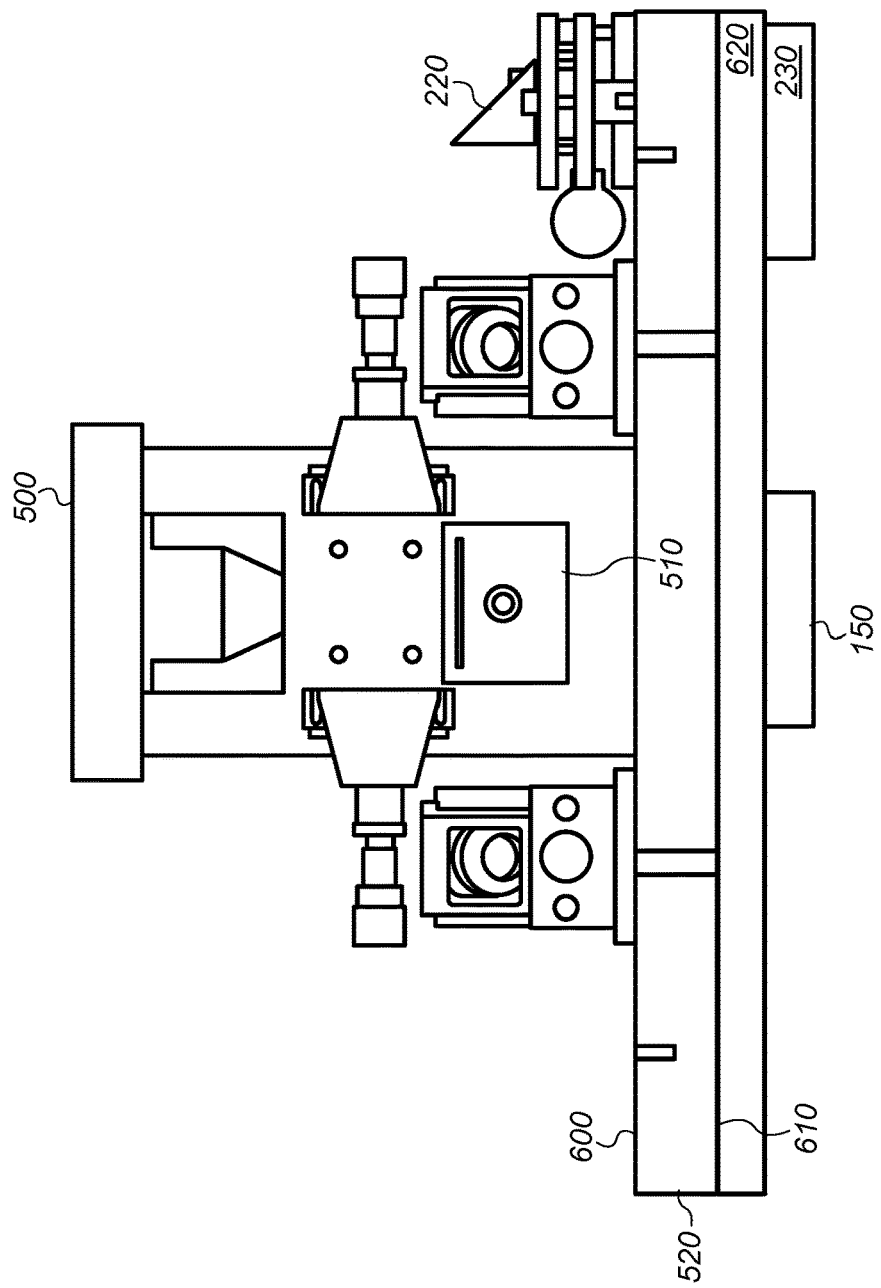
FIG. 7 is a drawing showing a front view of portions of the flow cytometer of FIG. 4.
Figure 8:
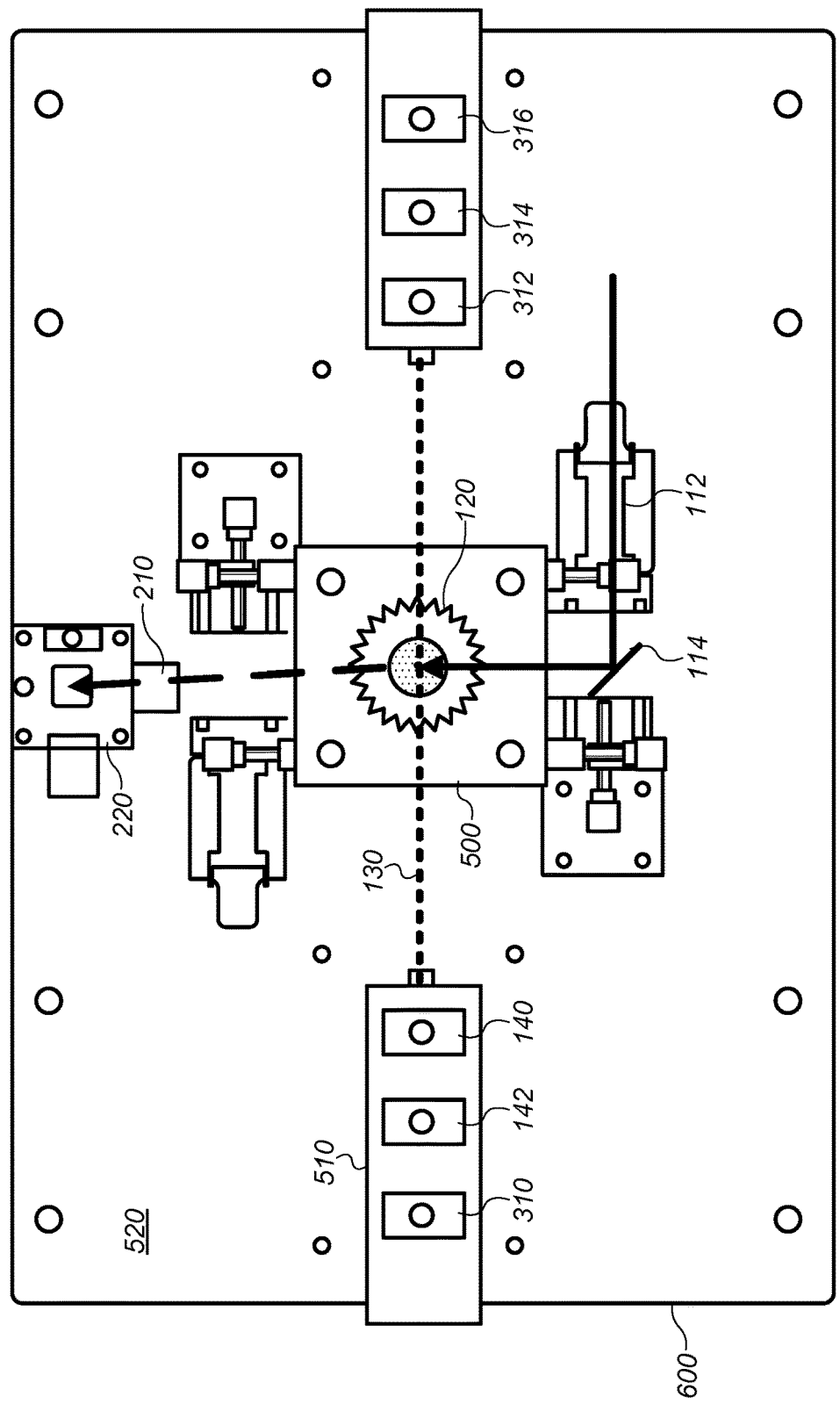
FIG. 8 is a drawing showing a top view of portions of the flow cytometer of FIG. 4.
Figure 9:
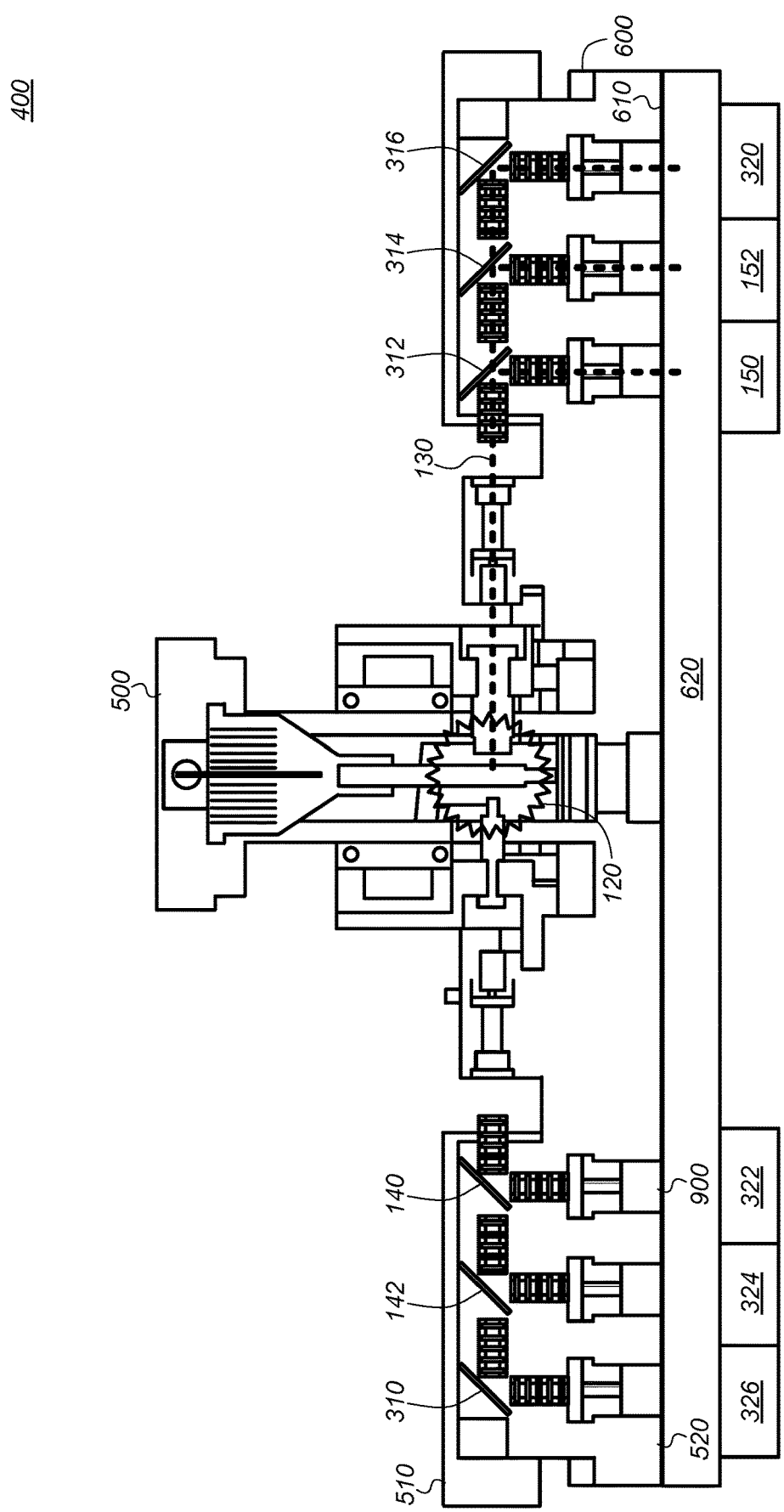
FIG. 9 is a drawing showing a cut-away side view of portions of the flow cytometer of FIG. 4.
Figure 10:
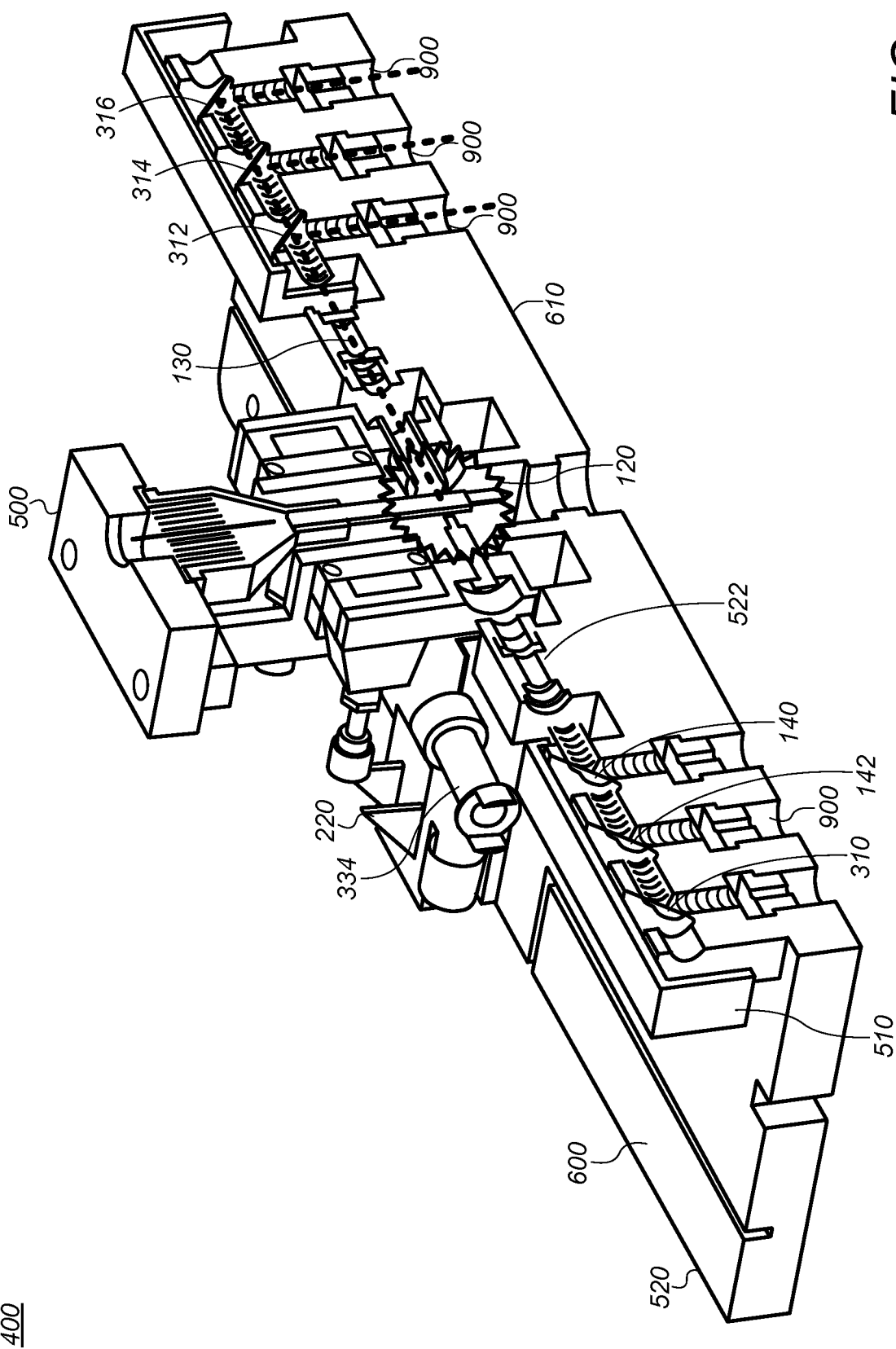
FIG. 10 is a drawing showing a cut-away top perspective view of portions of the flow cytometer of FIG. 4.

FIGS. 5-10 are drawings showing various views of a flow cytometer 400 of any of FIG. 4. FIG. 5 shows a top perspective view of flow cytometer 400. FIG. 6 shows a profile side view of flow cytometer 400. FIG. 7 shows a front view of flow cytometer 400. FIG. 8 shows a top view of flow cytometer 400. FIG. 9 shows a cut-away side view of flow cytometer 400. FIG. 10 shows a cut-away top perspective view of flow cytometer 400. Light sources 110 and 330 are not shown in FIGS. 5-10, but in various embodiments either or both are part of flow cytometer 400, and beam 112 (e.g., emitted by light source 110) is shown in FIGS. 5 and 8. FIGS. 5-10 include flow cell 500, reflective surface array 510, and baseplate 520. As shown in FIGS. 6, 7, and 9, flow cytometer 400 also includes optical isolation material 620 (discussed in further detail herein in connection to FIG. 11). Optical isolation material 620 may be a single piece of material as shown in FIGS. 6, 7, and 9, or it may be more than one piece of material. For example in various embodiments, a piece of optical isolation material 620 is disposed between baseplate 520 and optical sensors 150, 152, and 320 and another piece of optical isolation material 620 is disposed between baseplate 520 and optical sensors 322, 324, and 326. In various embodiments, a piece of optical isolation material 620 is disposed between baseplate 520 and optical sensor 230.

While FIGS. 5-10 show various views of flow cytometer 400 and three-dimensional light paths as discussed herein, various other embodiments of a flow cytometer may include three-dimensional light paths without including all of the components of flow cytometer 400. For example, the various flow cytometers 100, 200, and 300 shown in FIGS. 1-3 may include three-dimensional light paths (e.g., with various reflective surfaces disposed above the baseplate reflecting fluorescent emissions 130 or scattered light 210 through the baseplate to optical sensors disposed below the baseplate), Flow cell 500 defines the flow path of a sample under test through flow cytometer 400. As discussed herein, in various embodiments, sample is a fluid suspension of one or more particles where at least some of the particles include fluorescent material. In various embodiments, flow cell 500 is a cuvette. Further, in various embodiments, flow cell 500 is transparent and is made out of an optically clear material such as plastic, glass, or fused quartz. In embodiments, the sample is injected into, at, or near, the center of flow cell 500 in a process referred in the art to as "hydrodynamic focusing." Ideally, the flow cell 500 delivers the sample such that the particles including fluorescent material are delivered reproducibly to the center of the examination zone 120. As discussed herein, in various embodiments, examination zone 120 is a portion of flow cell 500. Further, in various embodiments, flow cell 500 is configured to flow the sample through the examination zone 120 one particle at a time, which may allow the fluorescence of a particular particle of the sample to be measured individually. Put another way, in various embodiments, flow cell 500 is configured such that no more than one entire bead of the sample is disposed in the examination zone 120 at any particular time. In various embodiments, flow cell 500 flows sample from a reservoir located above first side 600 to a second location (e.g., a second reservoir) located below second side 610.

Reflective surface array 510 is an enclosure that receives various reflective surfaces 140, 142, 310, 312, 314, 316 and holds the reflective surfaces over the various openings 900 through baseplate 520 such that fluorescent emissions 130 reflect off of reflective surfaces 140, 142, 310, 312, 314, 316, through openings 900, and to the optical sensors 150, 152, 320, 322, 324, 326. In various embodiments, reflective surface array 510 is opaque and sealed to outside light to minimize the number of unwanted photons (e.g., photons that are not part of fluorescent emissions 130) that reach optical sensors 150, 152, 320, 322, 324, 326. In comparison, in some embodiments there is no enclosure over reflective surface 220 (although in other embodiments, there is an enclosure over reflective surface 220). Having no enclosure over reflective surface 220 may, for example, allow more scattered light 210 to reach optical sensor 230.

Baseplate 520 is one or more pieces of material that secure the various components of flow cytometer 400. In various embodiments, baseplate 520 is a made of metal, polymer, composite, or a combination. In various embodiments, baseplate 520 includes one or more light tunnels 522 that restrict light coming from examination zone 120 to reflective surface array 510. These light tunnels 522 may be made of any of a number of materials, and include a hole through which fluorescent emissions 130 can pass but scattered light 210 is unlike to pass. Baseplate 520 includes a plurality of openings 900 (also referred to herein as apertures). In various embodiments, baseplate 520 includes a first side 600 and a second, opposite side 610. In various embodiments, baseplate 520 defines a plane between the first side 600 and the second side 610. Further, in various embodiments, first side 600 and second side 610 are parallel. For the sake of simplicity here, points in space and components closer to first side 600 than second side 610 are referred to as being "above" first side 600 and points in space and components closer to second side 610 than first side 600 are referred to as being "below" second side 610, but it will be understood that the baseplate 520 and flow cytometer 400 may be oriented in any direction (e.g., the center of the Earth does not necessarily have to be below second side 610). The various openings 900 allow light (e.g., fluorescent emissions 130 and/or scattered light 210) to pass from above first side 600, through baseplate 520, below second side 610, through optical isolation material 620, and to the various optical sensors 150, 152, 230, 320, 322, 324, and 326.

In various embodiments, light source 110; beam 112; optic 114; optic 116; examination zone 120; reflective surfaces 140, 142, 220, 310, 312, 314, and 316; light source 330; beam 332; optic 334; optic 336; flow cell 500; reflective surface array 510, and light tunnel(s) 522 are disposed above first side 600. In such embodiments, optical sensors 150, 152, 230, 320, 322, 324, and 326; optical isolation material 620; and controller (not shown) are disposed below second side 610. In such embodiments, reflective surfaces 140, 142, 220, 310, 312, 314, and 316 are disposed above their respective optical sensors 150, 152, 230, 320, 322, 324, and 326. In these embodiments, fluorescent emissions 130 and/or scattered light 210 begin above first side 600 and are reflected through openings 900 by various reflective surfaces 140, 142, 220, 310, 312, 314, and 316. After passing through baseplate 520 and optical isolation material 620, fluorescent emissions 130 and/or scattered light 210 is received by the various optical sensors 150, 152, 230, 320, 322, 324, and 326.

In various embodiments, the arrangement of flow cytometer 400 as shown in FIG. 5-10 confers a number of advantages. For example, by having the various visible light paths (e.g., beam 112, beam 332, fluorescent emissions 130, scattered light 210) lie along three dimensions, flow cytometer 400 reduces the possibility that unwanted photons (e.g., photons that are not from fluorescent emissions 130) reach the various optical sensors 150, 152, 320, 322, 324, and 326. As shown in FIG. 5, for example, beams 112 and 332 travel along the y-axis before being reflected by optic 114 and 336 and then travel along the x-axis and illuminate the sample at the examination zone 120. As discussed herein, after the fluorescent material(s) in the sample is excited by beam 112 and/or 332, the fluorescent material produces fluorescent emissions 130. Fluorescent emissions 130 may be emitted in any direction, but a portion of the fluorescent emissions 130 travels in a straight line along the y-axis through light tunnel 522 and into reflective surface array 510. The various reflective surfaces 140, 142, 310, 312, 314, and 316 reflect respective portions of fluorescent emissions 130 through respective openings 900 in baseplate 520 along the z-axis. The fluorescent emissions 130 are then in turn received by the various optical sensors 150, 152, 320, 322, 324, and 326. Because light path from examination zone 120 travels through light tunnel 522, reflective surface array 510, and openings 900 and along the y-axis and z-axis, it is unlikely that much if any light from beam 112 or beam 332 or light from outside sources will be able to travel along the same path that fluorescent emissions 130 travel. Accordingly, the number of photons received by optical sensors 150, 152, 320, 322, 324, and 326 that is not from fluorescent emissions 130 is reduced.

Additionally, because the various optical sensors 150, 152, 230, 320, 322, 324, and 326 and the controller are located below second side 610 of the baseplate 520, the various electrical and/or optical cables coupling the controller to the optical sensors 150, 152, 230, 320, 322, 324, and 326 may be disposed below second side 610 as well. Accordingly, such cables will not obstruct the path of beam 112, beam 332, fluorescent emissions 130, and scattered light 210.

Figure 11:
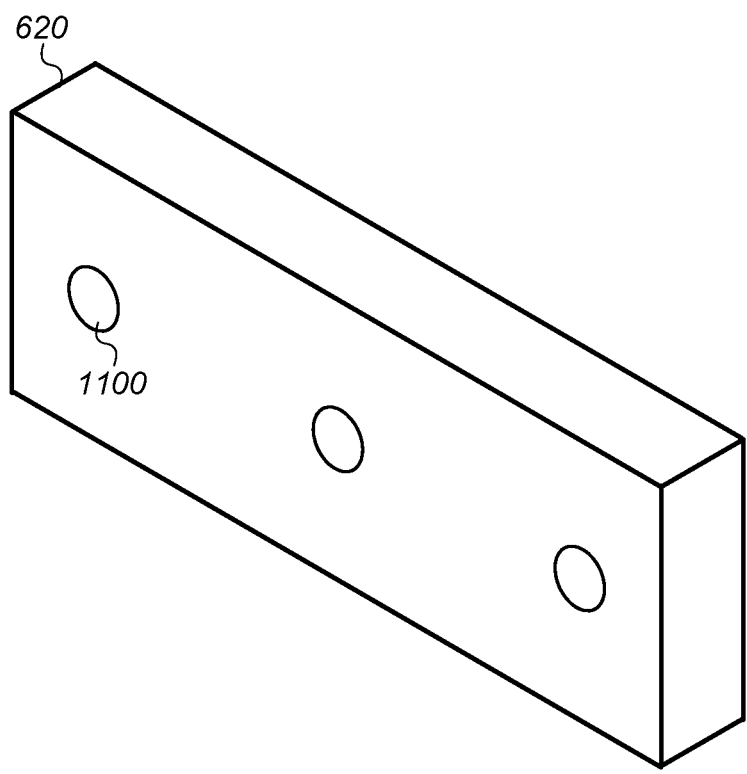
FIG. 11 is a drawing showing a perspective view of an optical isolation material using in accordance with the disclosed embodiments.

FIG. 11 is a drawing showing a perspective view of optical isolation material 620. In various embodiments, optical isolation material 620 comprises a sheet of polymer having one or more apertures 1100. In various embodiments, these apertures 1110 receive portions of the various optical sensors 150, 152, 230, 320, 322, 324, and 326 (e.g., the light receiving portion discussed herein). In various embodiments, optical isolation material 620 is opaque to the visible light spectrum and prevents visible light from reaching the light receiving portion of the various optical sensor 150, 152, 320, 322, 324, and 326 except for visible light (e.g., fluorescent emissions 130 or scattered light 210) reflected by the respective reflective surfaces 140, 142, 220, 310, 312, 314, and 316. In various embodiments, optical isolation material 620 is a single sheet of material, or it may be in multiple pieces.

Exemplary Methods

Figure 12:
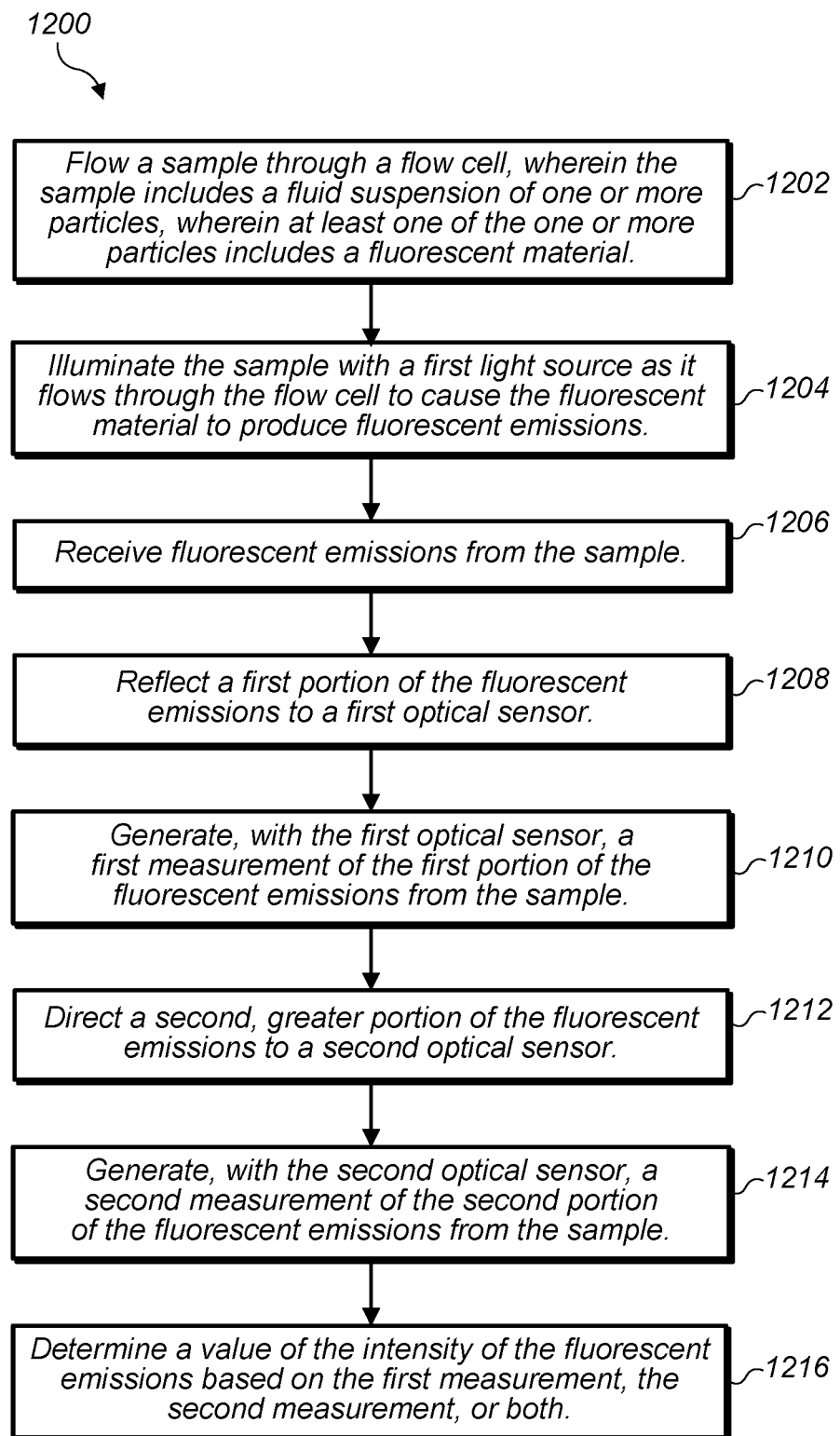
FIG. 12 is a flow chart illustrating a bifurcated path flow cytometry method, in accordance with the disclosed embodiments.
Figure 13:
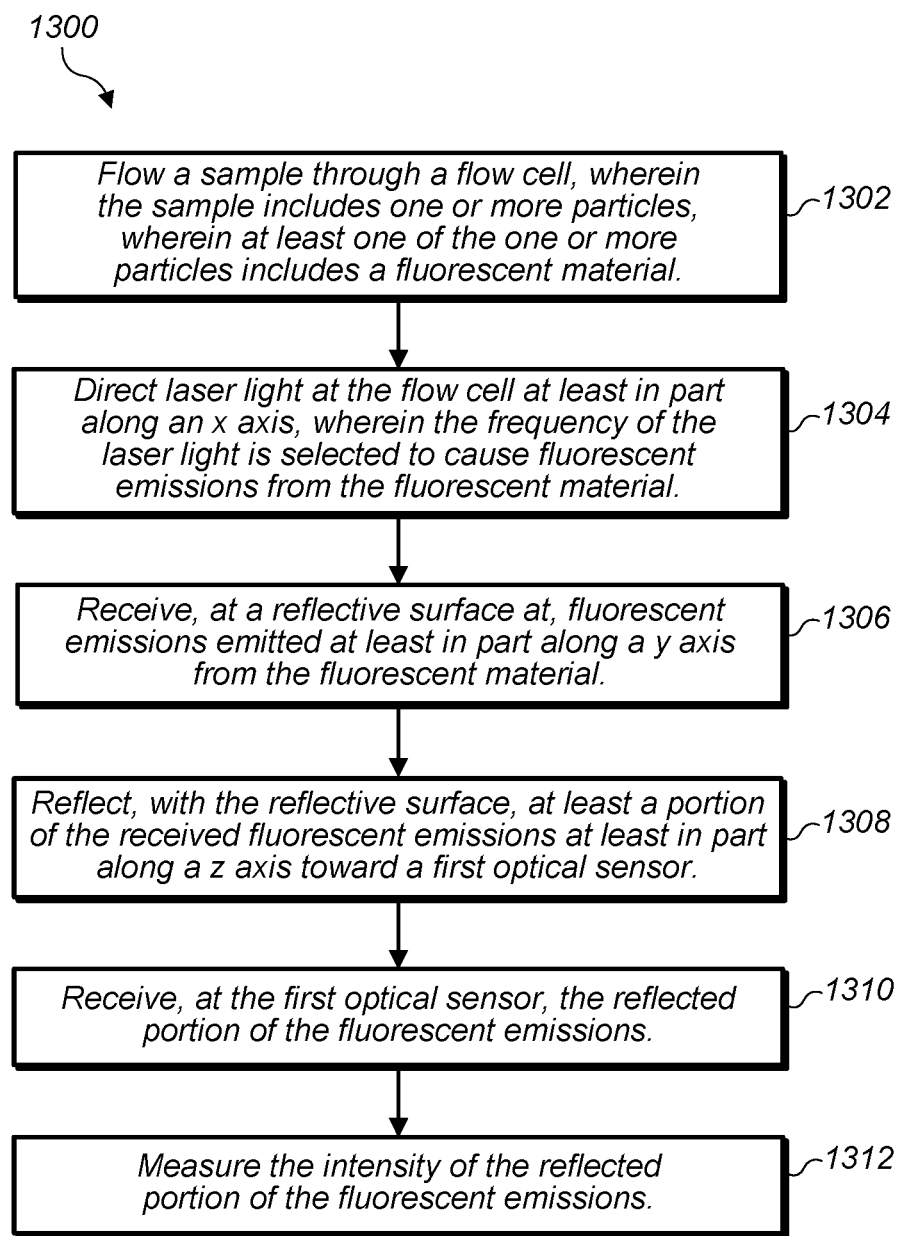
FIG. 13 is a flow chart illustrating a three-dimensional light path flow cytometry method, in accordance with the disclosed embodiments.
Figure 14:
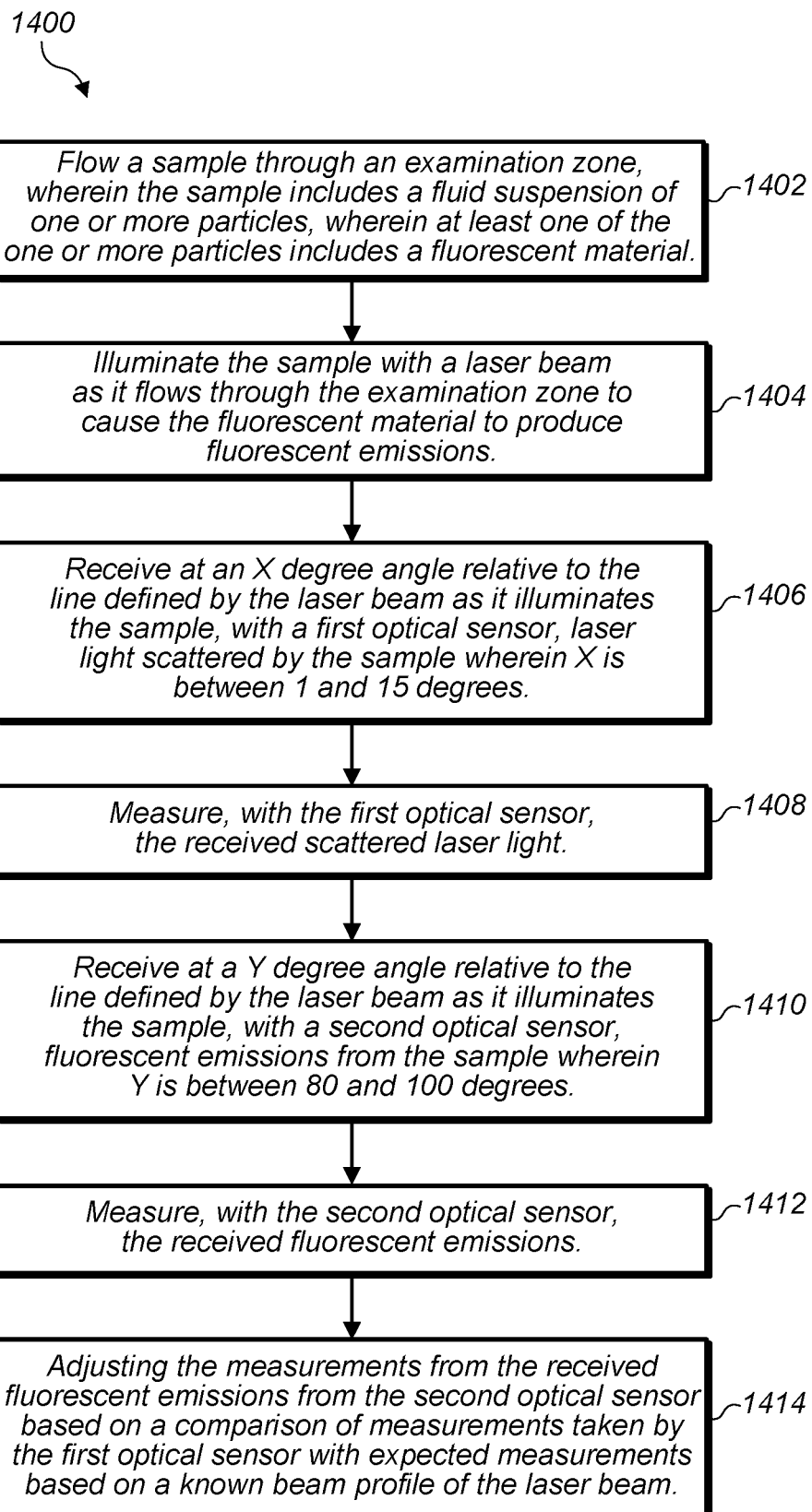
FIG. 14 is a flow chart illustrating a beam profile-based adjustment flow cytometry method, in accordance with the disclosed embodiments.

FIGS. 12-14 illustrate various flowcharts representing various disclosed methods implemented with various flow cytometers 100, 200, 300, 400 using one or more controllers. Referring now to FIG. 12, a flowchart illustrating an embodiment of a bifurcated path flow cytometry method 1200 is shown. In various embodiments, the various actions associated with method 1200 are performed with flow cytometers 100, 300, 400 using one or more controllers. At block 1202, flow cytometer 100, 300, 400 flows a sample through a flow cell 500. As discussed herein, in various embodiments, the sample includes a fluid suspension of one or more particles, wherein at least one of the one or more particles includes a fluorescent material. At block 1204, flow cytometer 100, 300, 400 illuminates the sample with a first light source 110 as it flows through the flow cell 500 to cause the fluorescent material to produce fluorescent emissions 130. At block 1206, flow cytometer 100, 300, 400 receives fluorescent emissions 130 from the sample. At block 1208, flow cytometer 100, 300, 400 reflects a first portion of the fluorescent emissions 130 to a first optical sensor 150. At block 1210, flow cytometer 100, 300, 400 generates, with the first optical sensor 150, a first measurement of the first portion of the fluorescent emissions 130 from the sample. At block 1212, flow cytometer 100, 300, 400 directs a second, greater portion of the fluorescent emissions 130 to a second optical sensor 152. At block 1214, flow cytometer 100, 300, 400 generates, with the second optical sensor 152, a second measurement of the second portion of the fluorescent emissions 130 from the sample. At block 1216, flow cytometer 100, 300, 400 determines a value of the intensity of the fluorescent emissions 130 based on the first measurement, the second measurement, or both.

Referring now to FIG. 13, a flowchart illustrating an embodiment of a three-dimensional light path flow cytometry method 1300 is shown. In various embodiments, the various actions associated with method 1300 are performed with flow cytometers 100, 200, 300, 400 using one or more controllers. At block 1302, flow cytometer 100, 200, 300, 400 flows a sample through a flow cell 500. As discussed herein, in various embodiments, the sample includes one or more particles, wherein at least one of the one or more particles includes a fluorescent material. At block 1304. flow cytometer 100, 200, 300, 400 directs laser light (e.g., beam 112) at the flow cell 500 (e.g., at examination zone 120) at least in part along an x axis, wherein the wavelength of the laser light is selected to cause fluorescent emissions 130 from the fluorescent material. At block 1306, flow cytometer 100, 200, 300, 400 receives, at a reflective surface 140, fluorescent emissions 130 emitted at least in part along a y axis from the fluorescent material. At block 1308, flow cytometer 100, 200, 300, 400 reflects, with the reflective surface 140, at least a portion of the received fluorescent emissions 130 at least in part along a z axis toward a first optical sensor 150. At block 1310, flow cytometer 100, 200, 300, 400 receive, at the first optical sensor 150, the reflected portion of the fluorescent emissions 130. At block 1310, flow cytometer 100, 200, 300, 400 measures the intensity of the reflected portion of the fluorescent emissions 130.

Referring now to FIG. 14, a flowchart illustrating an embodiment of a beam profile-based adjustment flow cytometry method 1400 is shown. In various embodiments, the various actions associated with method 1400 are performed with flow cytometers 200, 400 using one or more controllers. At block 1402, flow cytometer 200, 400 flows a sample through an examination zone 120. As discussed herein, in various embodiments, the sample includes a fluid suspension of one or more particles, wherein at least one of the one or more particles includes a fluorescent material. At block 1404, flow cytometer 200, 400 illuminates the sample with a laser beam (e.g., beam 112) as it flows through the examination zone 120 to cause the fluorescent material to produce fluorescent emissions 130. At block 1406, flow cytometer 200, 400 receives at an X degree angle relative to the line defined by the laser beam as it illuminates the sample, with a first optical sensor 230, laser light scattered (e.g., scattered light 210) by the sample wherein X is between 1 and 15 degrees. At block 1408, flow cytometer 200, 400 measures, with the first optical sensor 230, the received scattered laser light. At block 1410, flow cytometer 200, 400 receives at a Y degree angle relative to the line defined by the laser beam as it illuminates the sample, with a second optical sensor 150, fluorescent emissions 130 from the sample wherein Y is between 80 and 100 degrees. At block 1410, flow cytometer 200, 400 measures, with the second optical sensor 150, the received fluorescent emissions 130. At block 1412, flow cytometer 200, 400 adjusts the measurements from the received fluorescent emissions 130 from the second optical sensor 150 based on a comparison of measurements taken by the first optical sensor 230 with expected measurements based on a known beam profile of the laser beam.

Exemplary Computer System

Figure 15:
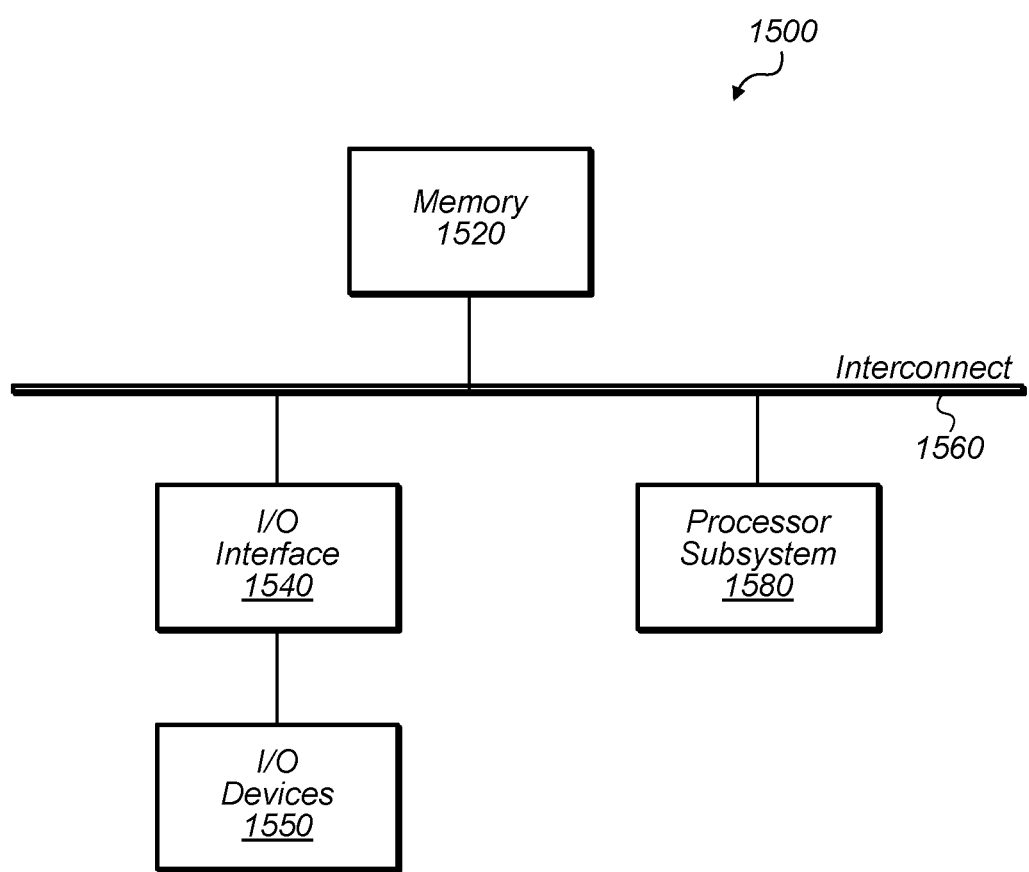
FIG. 15 is a block diagram of an exemplary computer system, which may implement a controller in accordance with the disclosed embodiments.

Turning now to FIG. 15, a block diagram of an exemplary computer system 1500, which may implement the various components of the controller of flow cytometer 100, 200, 300, 400, is depicted. Computer system 1500 includes a processor subsystem 1580 that is coupled to a system memory 1520 and I/O interfaces(s) 1540 via an interconnect 1560 (e.g., a system bus). I/O interface(s) 1540 is coupled to one or more I/O devices 1550. Computer system 1500 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 1500 is shown in FIG. 15 for convenience, system 1500 may also be implemented as two or more computer systems operating together.

Processor subsystem 1580 may include one or more processors or processing units. In various embodiments of computer system 1500, multiple instances of processor subsystem 1580 may be coupled to interconnect 1560. In various embodiments, processor subsystem 1580 (or each processor unit within 1580) may contain a cache or other form of on-board memory.

System memory 1520 is usable to store program instructions executable by processor subsystem 1580 to cause system 1500 perform various operations described herein. System memory 1520 may be implemented using different physical memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 1500 is not limited to primary storage such as memory 1520. Rather, computer system 1500 may also include other forms of storage such as cache memory in processor subsystem 1580 and secondary storage on I/O Devices 1550 (e.g., a hard drive, storage array, etc.). In some embodiments, these other forms of storage may also store program instructions executable by processor subsystem 1580.

I/O interfaces 1540 may be any of various types of interfaces configured to couple to and communicate with other devices, according to various embodiments. In one embodiment, I/O interface 1540 is a bridge chip (e.g., Southbridge) from a front-side to one or more back-side buses. I/O interfaces 1540 may be coupled to one or more I/O devices 1550 via one or more corresponding buses or other interfaces. Examples of I/O devices 1550 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 1500 is coupled to a network via a network interface device 1550 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus comprising:
 a flow cell configured to flow a sample through the apparatus, wherein the sample includes one or more particles, wherein at least one of the one or more particles includes a fluorescent material;
 a laser configured to illuminate the sample with a laser beam;

a first optical sensor positioned to measure a first portion of the laser beam scattered by the sample;
a second optical sensor positioned to measure fluorescent emissions from the sample produced as a result of the sample absorbing a second portion of the laser beam; and
a controller configured to adjust measurements taken by the second optical sensor based on a comparison of measurements taken by the first optical sensor with expected measurements based on a known beam profile of the laser beam.

2. The apparatus of claim 1, wherein the first optical sensor is disposed at an X degree angle relative the line defined by the laser beam as it illuminates the sample, wherein X is between 1 and 15 degrees.

3. The apparatus of claim 1, wherein the comparison indicates a proportional relationship between a measurement of fluorescent emissions taken by the second optical sensor and a measurement of scattered laser light taken by the first optical sensor.

4. The apparatus of claim 1, further comprising:
a baseplate including a first side, a second, opposing side, a first aperture defining a first opening through the baseplate from the first side to the second side, and a second aperture defining a second opening through the baseplate from the first side to the second side;
a first reflective surface disposed above the first side, the first reflective surface configured to receive light emitted from the flow cell and reflect the light through the first opening toward the first optical sensor; and
a second reflective surface disposed above the first side, the second reflective surface configured to receive light from the flow cell and reflect the light through the second opening toward the second optical sensor; and
wherein the flow cell and laser are disposed above the first side, wherein the first optical sensor, second optical sensor, and controller are disposed below the first side.

5. The apparatus of claim 4, further comprising:
a third optical sensor configured to measure fluorescent emissions from the sample;
wherein the controller is configured to adjust the measurements taken by the third optical sensor based on a comparison of measurements taken by the first optical sensor with expected measurements based on a known beam profile of the laser beam.

6. The apparatus of claim 5, further comprising a partially-reflective surface configured to reflect a first portion of fluorescent emissions from the sample to the second optical sensor and direct a second, greater portion of fluorescent emissions from the sample to the third optical sensor.

7. The apparatus of claim 5, wherein the second optical sensor includes second detection cells and the third optical sensor includes third detection cells, and wherein the third detection cells are between 20-80 percent larger than the second detection cells.

8. The apparatus of claim 5, wherein the second optical sensor and third optical sensor are disposed at Y degree angle relative the line defined by the laser beam as it illuminates the sample, wherein Y is between 80 and 100 degrees.

9. The apparatus of claim 1, wherein the controller is configured to adjust measurements taken by the second optical sensor by decreasing a detection threshold for the sample when the measurement taken by the first optical sensor is above a first scatter threshold.

10. The apparatus of claim 1, wherein the controller is configured to adjust measurements taken by the second optical sensor by increasing a detection threshold for the sample when the measurement taken by the first optical sensor is below a second scatter threshold.

11. An apparatus, comprising:
a flow cell configured to flow a sample through the apparatus, wherein the sample includes one or more particles, wherein at least one of the one or more particles includes a fluorescent material;
a laser configured to illuminate the sample with a laser beam;
a first optical sensor configured to measure signals from the laser that are scattered at an X degree angle relative to the line defined by the laser beam as it illuminates the sample, wherein X is between 1 and 15 degrees;
a second optical sensor configured to measure fluorescent emissions from the sample at a Y degree angle relative to the line defined by the laser beam as it illuminates the sample, wherein Y is between 80 and 100 degrees; and
a controller configured to adjust measurements taken by the second optical sensor based on a comparison of measurements taken by the first optical sensor with expected measurements based on a known beam profile of the laser beam.

12. The apparatus of claim 11, wherein the comparison indicates a proportional relationship between a measurement of fluorescent emissions taken by the second optical sensor and a measurement of scattered laser light taken by the first optical sensor.

13. The apparatus of claim 11, wherein the controller is configured to decrease a detection threshold for the sample when the measurement taken by the first optical sensor is above a first scatter threshold.

14. The apparatus of claim 11, wherein the controller is configured to increase a detection threshold for the sample when the measurement taken by the first optical sensor is below a second scatter threshold.

15. The apparatus of claim 11, wherein the laser is configured to illuminate the sample by emitting a laser beam directed at an examination zone, wherein the flow cell is configured to flow the sample through the examination zone one particle at a time.

16. A method comprising:
flowing a sample through an examination zone, wherein the sample includes a fluid suspension of one or more particles, wherein at least one of the one or more particles includes a fluorescent material;
illuminating the sample with a laser beam as it flows through the examination zone to cause the fluorescent material to produce fluorescent emissions;
receiving at an X degree angle relative to the line defined by the laser beam as it illuminates the sample, with a first optical sensor, laser light scattered by the sample wherein X is between 1 and 15 degrees;
measuring, with the first optical sensor, the received scattered laser light;
receiving at a Y degree angle relative to the line defined by the laser beam as it illuminates the sample, with a second optical sensor, fluorescent emissions from the sample wherein Y is between 80 and 100 degrees;
measuring, with the second optical sensor, the received fluorescent emissions; and
adjusting the measurements from the received fluorescent emissions from the second optical sensor based on a comparison of measurements taken by the first optical sensor with expected measurements based on a known beam profile of the laser beam.

17. The method of claim 16, wherein the adjusting includes adjusting a detection threshold for the sample.

18. The method of claim 16, wherein some of the particles of the sample comprise beads including fluorescent dye, and wherein no more than one entire bead is disposed in the examination zone at any particular time.

19. The method of claim 16,
   wherein illuminating the sample includes illuminating a particular particle that includes fluorescent material;
   wherein the known beam profile indicates that the center of the laser beam has a higher intensity than the edges of the laser beam; and
   wherein the adjusting includes:
      determining, based on the comparison of measurements taken by the first optical sensor with expected measurements based on a known beam profile of the laser that the center of the laser beam did not illuminate the center of the particular particle, and
      based on the determining, increasing the measurement from the received fluorescent emissions from the second optical sensor.

20. The method of claim 16, wherein the comparison indicates a proportional relationship between a measurement of fluorescent emissions taken by the second optical sensor and a measurement of scattered laser light taken by the first optical sensor.

* * * * *